(12) United States Patent
Kanehara et al.

(10) Patent No.: US 12,728,897 B2
(45) Date of Patent: Sep. 8, 2026

(54) DETECTION OF LOSS-OF-CONTROL VULNERABLE ROAD USERS IN AUTOMOTIVE ENVIRONMENTS

(71) Applicant: Waymo LLC, Mountain View, CA (US)

(72) Inventors: Lenna Kanehara, San Francisco, CA (US); Kevin Sheu, San Jose, CA (US); Clayton Gregory Kunz, Mill Valley, CA (US)

(73) Assignee: Waymo LLC

( * ) Notice: Subject to any disclaimer, the term of this patent is extended or adjusted under 35 U.S.C. 154(b) by 92 days.

(21) Appl. No.: 18/954,098

(22) Filed: Nov. 20, 2024

(65) Prior Publication Data

US 2026/0138647 A1 May 21, 2026

(51) Int. Cl.
*B60W 60/00* (2020.01)
*G06V 10/764* (2022.01)
*G06V 20/58* (2022.01)

(52) U.S. Cl.
CPC ....... *B60W 60/0017* (2020.02); *G06V 10/764* (2022.01); *G06V 20/58* (2022.01); *G06V 2201/07* (2022.01)

(58) Field of Classification Search
CPC . B60W 60/0017; G06V 10/764; G06V 20/58; G06V 2201/07
See application file for complete search history.

(56) References Cited

U.S. PATENT DOCUMENTS 11,978,266 B2 * 5/2024 Arar ...................... G06V 20/56
2017/0119311 A1 * 5/2017 Iwasaki .................. G02C 7/083
2018/0186349 A1 * 7/2018 Kim ...................... G06V 40/10
2021/0179096 A1 * 6/2021 Shalev-Shwartz .... B60W 30/09
2021/0394705 A1 * 12/2021 Kourous-Harrigan ...................... G06T 19/006
2022/0180735 A1 * 6/2022 Schonfeld ............. G08G 1/012
(Continued)

OTHER PUBLICATIONS

Pedestrian-Centric 3D Pre-collision Pose and Shape Estimation from Dashcam Perspective Meijun Wang1, Yu Meng1*, Zhongwei Qiu2, Chao Zheng1, Yan Xu1, Xiaorui Peng1, Jian Gao3 1University of Science and Technology Beijing 2Alibaba DAMO Academy (Year: 2024).*

(Continued)

*Primary Examiner* — Donald J Wallace
*Assistant Examiner* — Jalal C Coduroglu
(74) *Attorney, Agent, or Firm* — Van Hoven PC; Jordan Becker

(57) ABSTRACT

The disclosed systems and techniques are directed to identifying and responding to presence of vulnerable road users (VRUs) in driving environments that are at risk of loss of control of their driving trajectories. The techniques include collecting, using a sensing system of an autonomous vehicle, sensing data for an environment of the autonomous vehicle and processing the sensing data by one or more machine learning models to identify a plurality of reference points associated with a VRU in the environment. The techniques further include identifying one or more height differentials for the plurality of reference points, determining that the VRU is at risk of loss of control, based at least on a change of the one or more height differentials, and causing a control system of the autonomous vehicle to perform an avoidance action.

20 Claims, 8 Drawing Sheets

(56) References Cited

U.S. PATENT DOCUMENTS

| | | | | |
|---|---|---|---|---|
| 2022/0332350 | A1* | 10/2022 | Jha | H04W 4/023 |
| 2023/0110467 | A1* | 4/2023 | Jha | G08G 1/096791<br>701/24 |
| 2023/0256997 | A1* | 8/2023 | Lee | B60W 50/00<br>701/23 |
| 2024/0260544 | A1* | 8/2024 | Hotta | A01K 15/02 |

OTHER PUBLICATIONS

Extended European Search Report for European Application No. 25217148.3 mailed Mar. 9, 2026, 12 Pages.
Lin C et al., "A Framework for Fall Detection Based on OpenPose Skeleton and LSTM/GRU Models", Applied Sciences, Dec. 31, 2020, vol. 11, No. 1, pp. 1-20.
Schachner M et al., "Extracting Quantitative Descriptions of Pedestrian Pre-crash Postures from Real-world Accident Videos", IRCOBI conference 2020, Sep. 30, 2020, pp. 1-19.
Wang M et al., "Pedestrian-Centric 3D Pre-collision Pose and Shape Estimation from Dashcam Perspective", NeurIPS 2024, Sep. 25, 2024, pp. 1-29.
Weiming C et al., "Fall Detection Based on Key Points of Human-Skeleton Using OpenPose", Symmetry, May 5, 2020, vol. 12(5), pp. 1-17.
Zhu Yanying et al., "VRFfall: Cross Vision-RF Fall Detection with Camera and mmWave Radar", ICPADS), Oct. 10, 2024, pp. 1-8.

* cited by examiner

DETECTION OF LOSS-OF-CONTROL VULNERABLE ROAD USERS IN AUTOMOTIVE ENVIRONMENTS

TECHNICAL FIELD

The instant specification generally relates to autonomous vehicles. More specifically, the instant specification relates to automated detection of objects in automotive environments that are at risk of losing control of their motion.

BACKGROUND

An autonomous (fully and partially self-driving) vehicle (AV) operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Positioning System (GPS) data and road map data. While the GPS and the road map data can provide information about static aspects of the environment (buildings, street layouts, road closures, etc.), dynamic information (such as information about other vehicles, pedestrians, street lights, etc.) is obtained from contemporaneously collected sensing data. Precision and safety of the driving path and of the speed regime selected by the autonomous vehicle depend on timely and accurate identification of various objects present in the outside environment and on the ability of a driving algorithm to process the information about the environment and to provide correct instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which.

SUMMARY

Figure 1:
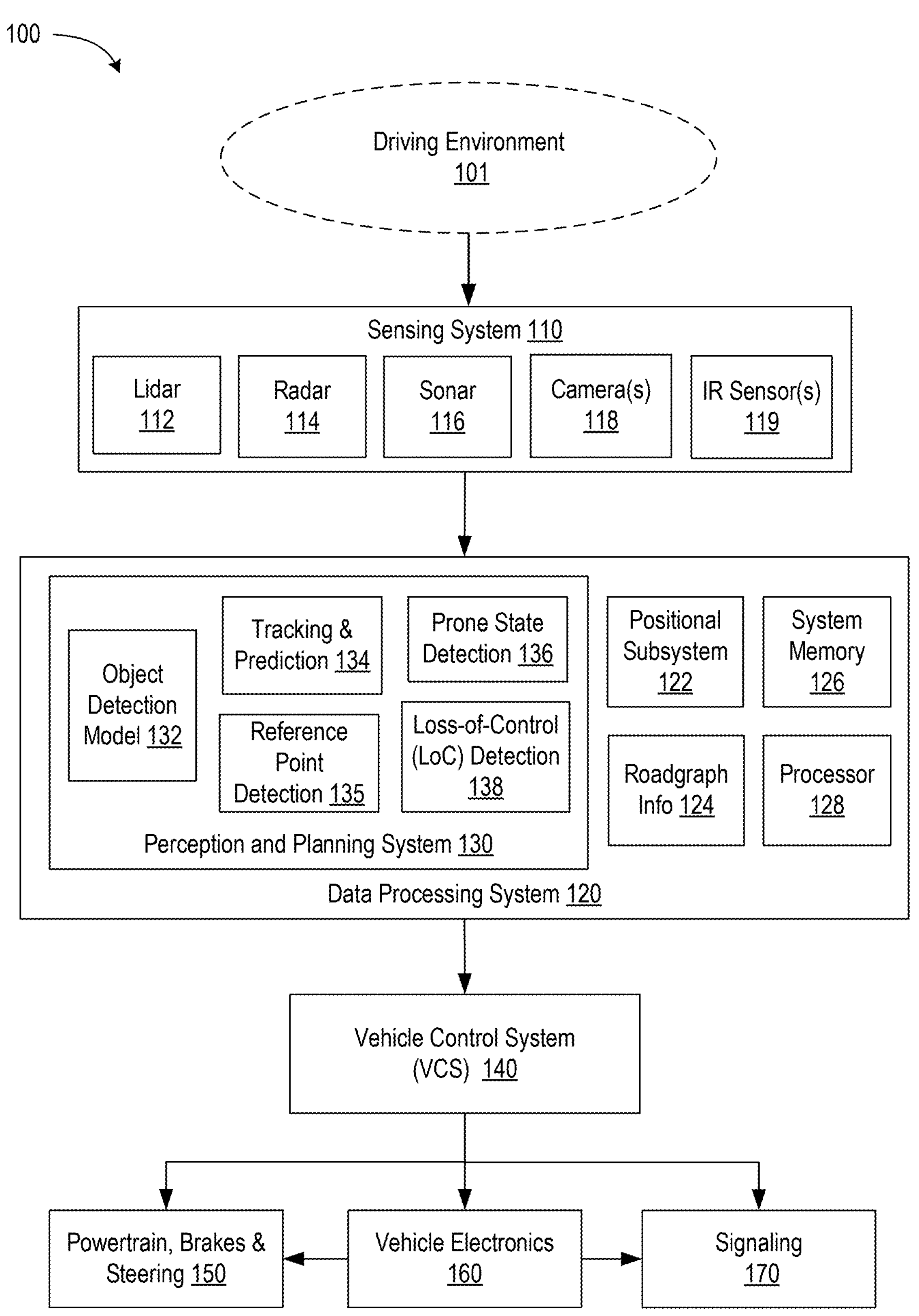
FIG. 1 is a diagram illustrating components of an example autonomous vehicle (AV) capable of detection of loss of control (LoC) of vulnerable road users (VRUs) in driving environments, in accordance with some implementations of the present disclosure.

In one implementation, disclosed is a system that includes a sensing system of an autonomous vehicle. The sensing system is to collect sensing data for an environment of the autonomous vehicle. The system further includes a perception system of the autonomous vehicle. The perception system is to process the sensing data by one or more machine learning models to identify a plurality of reference points associated with a vulnerable road user (VRU) in the environment, identify one or more height differentials for the plurality of reference points, determine that the VRU is at risk of loss of control, based at least on a change of the one or more height differentials, and cause a control system of the autonomous vehicle to perform an avoidance action.

In another implementation, disclosed is a system that includes a sensing system of an autonomous vehicle. The sensing system is to collect sensing data for an environment of the autonomous vehicle. The system further includes a perception system of the autonomous vehicle. The perception system is to process the sensing data by one or more machine learning models to identify a plurality of reference points associated with a vulnerable road user (VRU) in the environment and determine a prone state score for the VRU. The prone state score characterizes a likelihood that the VRU is in a prone position or transitioning to the prone position. The perception system is further to identify one or more height differentials for the plurality of reference points, and determine that the VRU is at risk of loss of control, based on an acceleration of the VRU and at least one of a change of the one or more height differentials or the prone state score. The perception system is further to cause a control system of the autonomous vehicle to perform an avoidance action.

In yet another implementation, disclosed is a method that includes collecting, using a sensing system of an autonomous vehicle, sensing data for an environment of the autonomous vehicle, processing the sensing data by one or more machine learning models to identify a plurality of reference points associated with a vulnerable road user (VRU) in the environment, identifying one or more height differentials for the plurality of reference points, determining that the VRU is at risk of loss of control, based at least on a change of the one or more height differentials, and causing a control system of the autonomous vehicle to perform an avoidance action.

DETAILED DESCRIPTION

An autonomous vehicle or a vehicle deploying various driver assistance features can use multiple sensor modalities to facilitate detection and identification of objects in the driving environments and tracking trajectories of these objects. Sensors can include radio detection and ranging (radar) sensors, light detection and ranging (lidar) sensors, multiple digital cameras, sonars, geolocation sensors, positional sensors, and the like. Different types of sensors can provide different and complementary benefits. For example, radars and lidars emit electromagnetic signals (radio signals or optical signals) that reflect from the objects and carry back information about distances to the objects (e.g., from the time of flight of the signals) and velocities of the objects (e.g., from the Doppler shift of the frequencies of the reflected signals). Radars and lidars can scan an entire 360-degree view by using a series of consecutive sensing frames. Sensing frames can include numerous reflections covering the outside environment in a dense grid of return points. Each return point can be associated with the distance to the corresponding reflecting object and a radial velocity (a component of the velocity along the line of sight) of the reflecting object.

Lidars, by virtue of their sub-micron optical wavelengths, have high spatial resolution, which allows obtaining many closely spaced return points from the same object. This enables accurate detection and tracking of objects once the objects are within the reach of lidar sensors. Lidars have an operating range of 150-350 m, depending on a specific lidar model, with higher ranges typically achieved by more powerful and expensive systems.

Radar sensors are inexpensive, require less maintenance than lidar sensors, have a large working range of distances, and have a good tolerance of adverse weather conditions. As a result of much longer (radio) wavelengths used by radars, resolution of radar data is much lower than that of lidars. In particular, while radars are capable of accurate determination of velocities of objects moving with not too small velocities (relative to the radar receiver), detecting accurate locations of objects can be often problematic.

Cameras (e.g., photographic or video cameras) can acquire high resolution images at both shorter distances (where lidars operate) and longer distances (where lidars do not reach. Cameras capture two-dimensional projections of the three-dimensional outside space onto an image plane (or some other non-planar imaging surface). Cameras have a longer, than lidars, operating range but determine positions of objects with a higher error along the radial direction compared with the lateral directions.

Camera and lidar images (as well as radar images, in some applications) can be processed by various object detection models, including deep learning neural network models. Such models can determine positions and orientations of objects and evolution of the positions and orientations of the objects with time. These models can further classify the objects by type (e.g., truck, car, school bus, motorcyclist, pedestrian, and/or the like), manufacturer, model, and/or the like.

Driving environments can change very rapidly and create situations where various objects and road users are at risk of colliding with other objects. Among the objects that are most at risk in such situations are pedestrians, bicyclists, scooter riders, motorcyclists, and/or other users that are unprotected in collisions by a body of a vehicle, unlike drivers or passengers of cars, buses, trucks, and/or other bodied vehicles. Such high-risk users are referred to as vulnerable road users (VRUs) herein. Any collision, even at low speed, of a VRU with another object, e.g., a bodied vehicle or another VRU, can cause a significant injury to the VRU. In some situations, risks of accidents in which VRUs can be involved increase even further. For example, a bicyclist or a motorcyclist may lose control because of a road defect, ice, equipment malfunction, inattention, lack of experience, contact with an external object (a vehicle or another VRU), and/or for some other reason. Such situations are referred to as loss-of-control (LoC) situations herein. An LoC event can cause the VRU to change a pattern of motion, often in an unpredictable way. For example, a pedestrian slipping or stumbling while walking on a sidewalk can land on the roadway. A bicyclist or a scooter attempting to regain control can quickly veer across the roadway. A motorcyclist miscalculating a cornering angle or surface traction while making a turn can fall and slide across multiple lanes. Early detection, by autonomous driving vehicles and vehicles equipped with driver-assist technology, of situations that are prone to developing into loss-of-control events are important for safety of all road users and, specifically, to safety of VRUs unprotected by a rigid vehicle body. Automated detection of possible LoC situations is challenging since collecting significant amounts of data related to occurrences of such situations is difficult (given relatively low percentage of driving missions in which LoC events occur).

Aspects and implementations of the instant disclosure address these and other challenges of the existing object detection and tracking technology by providing for systems and techniques that efficiently and timely identify VRUs that are at risk of a loss of control, in the process of losing control (e.g., slipping, falling, etc.), or experiencing a post-LoC aftermath (e.g., lying or sitting on the ground, attempting to get up, and/or the like). Timely detection of impending or likely LoC situations or a post-LoC state allows a vehicle (e.g., an autonomous vehicle) to take appropriate and timely response actions to eliminate or reduce the risk of secondary collisions with VRUs. Additionally, in some instances a vehicle can cause an LoC of a VRU even without a direct physical contact with the VRU. For example, a vehicle—by action or, sometimes, inaction—may cause a VRU to attempt an avoidance maneuver and change its planned trajectory, e.g., by swerving, braking, jumping, etc., in a way that causes the VRU to lose control and fall. The driver or owner of the vehicle (e.g., autonomous vehicle owner) that caused such an event can have a legal (and/or moral) obligation to remain at the scene of the accident and be available to the VRU and/or any official investigation that may commence. Correspondingly, the vehicle may need a capability to detect such incidents even when no direct contact with the VRU (or some other object) has been detected.

In some implementations, the disclosed techniques include a VRU monitoring system that uses sensing data (e.g., lidar, radar, camera data, and/or the like) to identify various VRUs in the environment—pedestrians (including joggers), bicyclists, scooter riders, wheelchair riders, skateboarders, and/or any other road or sidewalk users unprotected by hard walls of vehicles—and determine the state of the motion of the identified VRU, including location, velocity, acceleration, history or motion, and/or the like. A trained reference point detection model can use sensing data associated with an individual object to determine locations of multiple reference points in the VRU. In an example of a pedestrian, such reference points can include one or more upper-body reference points, e.g., nose, chin, top of the head, ears, and/or the like, and one or more lower-body reference points, e.g., ankles, knees, points of contact between feet and ground, and/or the like. An LoC detection engine can compute one or more LoC metrics, e.g., using the difference in the heights (differential) of the upper-body and the lower-body reference points, $D(t)=H_{upper}(t)-H_{lower}(t)$, e.g., the height differential between the nose and the ankle (s), and track this difference D(t) across different time frames of sensing data, e.g., $t_1$, $t_2$, . . . . The LoC detection engine can determine an onset of an LoC by identifying an above-threshold change in the height differential D(t) representative of a person losing balance and beginning to fall on the ground. In some implementations, the choice of reference points can depend on a specific type of object. For example, as facial features of a motorcyclist can be obscured by a helmet, the reference point detection model can use a geometric center of the helmet, a top of the helmet, a visor of the helmet, and/or the like. In some implementations, selection of reference points can be contingent on the type of the object identified by an additional object type detection model (or an additional classification head of the model that determines the reference points). In some implementations, alternative reference points—having some degree of equivalency—can be selected based on a view of the VRU. For example, a nose or chin can be used as a reference point for a pedestrian facing the sensing system, an ear can be selected for a pedestrian positioned sideways to the sensing system, a center of the back of the head can be selected for a pedestrian facing away from the sensing system, and/or the like. In some implementations, additional reference points (and the corresponding height differences) can be tracked, e.g., right and/or left shoulder, right and/or left elbow, right and/or left wrist, right and/or left hip, right and/or left knee and so on.

Once the LoC detection engine determines the onset of an LoC event, the vehicle can respond by slowing down (e.g., reducing the amount of throttle and/or braking), moving over to a driving lane (if unoccupied) that is farther away from the VRU than the current lane of the vehicle's travel. In some implementations, the LoC module can use additional input(s) to reliably determine the onset of an LoC event and eliminate false positive detections. For example, a change of D(t) can be caused by a benign activity, e.g., a pedestrian sitting down to fix untied shoelaces or bending to pick up a dropped object. To rule out such false positives, the LoC module can additionally track acceleration of the VRU. An LoC event can be detected provided that both a change of D(t) has occurred (or is in the process of occurring) and the VRU is experiencing a (negative) threshold acceleration, which is likely associated with a disruption of a normal travel of the VRU, e.g., because of falling, colliding with another object, hard braking, and/or the like.

An additional prone state detection model can process the sensing data and determine a likelihood, e.g., a prone state score S, that the VRU captured in the sensing data is in a prone position (e.g., lying on the ground). The prone state can be a continuous value within a certain predefined (in training) range, e.g., between S=0 (fully upright state) and S=1 (fully prone state). The prone state score S(t) can be tracked similarly to the height differential D(t) and the rate of change of S(t) may be used to indicate an onset of an LoC event. In some implementations, the determination of an LoC event is made provided that as least one of the prone state score S(t) or the rate of change of the height differential D(t) exceed respective thresholds. In other implementations, a determination of an LoC event is made provided that both the prone state score S(t) and the height differential D(t) exceed the respective thresholds.

Numerous other implementations are disclosed herein. The advantages of the disclosed techniques and systems include, but are not limited to, a timely and efficient identification of VRUs that are likely to lose control of their trajectories and are at risk of being hit or collide with other objects and road users and taking appropriate defensive actions to reduce the risk of such accidents. Further advantages include facilitating a proper response to an incident according to legal requirements in those instances where the vehicle (e.g., autonomous vehicle) may be involved in a situation where an incident occurred without direct physical interaction ("contactless collision") between the vehicle and the VRU.

In those instances where description of implementations refers to autonomous vehicles, it should be understood that similar techniques can be used in various driver assistance systems that do not rise to the level of fully autonomous driving systems. More specifically, disclosed techniques can be used in Level 2 driver assistance systems that implement steering, braking, acceleration, lane centering, adaptive cruise control, etc., as well as other driver support. Likewise, the disclosed techniques can be used in Level 3 driving assistance systems capable of autonomous driving under limited (e.g., highway) conditions. In such systems, fast and accurate detection and tracking of objects can be used to inform the driver of the approaching vehicles and/or other objects, with the driver making the ultimate driving decisions (e.g., in Level 2 systems), or to make certain driving decisions (e.g., in Level 3 systems), such as reducing speed, changing lanes, etc., without requesting driver's feedback.

FIG. 1 is a diagram illustrating components of an example autonomous vehicle (AV) 100 capable of detection of loss of control (LoC) of vulnerable road users (VRUs) in driving environments, in accordance with some implementations of the present disclosure. Autonomous vehicles can include motor vehicles (cars, trucks, buses, motorcycles, all-terrain vehicles, recreational vehicles, any specialized farming or construction vehicles, and the like), or any other self-propelled vehicles (e.g., robots, factory or warehouse robotic vehicles, sidewalk delivery robotic vehicles, etc.) capable of being operated in a self-driving mode (without a human input or with a reduced human input). "Objects," as referenced herein, can include any entity, item, device, body, or article (animate or inanimate) located outside the autonomous vehicle, such as roadways, buildings, trees, bushes, sidewalks, bridges, mountains, other vehicles, piers, banks, landing strips, animals, birds, or other things.

A driving environment 101 can include any objects (animate or inanimate) located outside the AV, such as roadways, buildings, trees, bushes, sidewalks, bridges, mountains, other vehicles, pedestrians, and so on. The driving environment 101 can be urban, suburban, rural, and so on. In some implementations, the driving environment 101 can be an off-road environment (e.g., farming or other agricultural land). In some implementations, the driving environment can be an indoor environment, e.g., the environment of an industrial plant, a shipping warehouse, a hazardous area of a building, and so on. In some implementations, the driving environment 101 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 101 can be located at any distance from the AV, from close distances of several feet (or less) to several miles (or more).

As described herein, in a semi-autonomous or partially autonomous driving mode, even though the vehicle assists with one or more driving operations (e.g., steering, braking and/or accelerating to perform lane centering, adaptive cruise control, advanced driver assistance systems (ADAS), or emergency braking), the human driver is expected to be situationally aware of the vehicle's surroundings and supervise the assisted driving operations. In such driving mode(s), even though the vehicle may perform all driving tasks in certain situations, the human driver is expected to be responsible for taking control as needed.

Although, for brevity and conciseness, various systems and methods may be described below in conjunction with autonomous vehicles, similar techniques can be used in various driver assistance systems that do not rise to the level of fully autonomous driving systems. In the United States, the Society of Automotive Engineers (SAE) have defined different levels of automated driving operations to indicate how much, or how little, a vehicle controls the driving, although different organizations, in the United States or in other countries, may categorize the levels differently. More specifically, disclosed systems and methods can be used in SAE Level 2 (L2) driver assistance systems that implement steering, braking, acceleration, lane centering, adaptive cruise control, etc., as well as other driver support. The disclosed systems and methods can be used in SAE Level 3 (L3) driving assistance systems capable of autonomous driving under limited (e.g., highway) conditions. Likewise, the disclosed systems and methods can be used in vehicles that use SAE Level 4 (L4) self-driving systems that operate autonomously under most regular driving situations and require only occasional attention of the human operator. In all such driving assistance systems, accurate assessment of the driving environment can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

The example AV 100 can include a sensing system 110. The sensing system 110 can include various electromagnetic (e.g., optical) and non-electromagnetic (e.g., acoustic) sensing subsystems and/or devices. The sensing system 110 can include a radar 114 (or multiple radars 114), which can be any system that utilizes radio or microwave frequency signals to sense objects within the driving environment 101 of the AV 100. The radar(s) 114 can be configured to sense both the spatial locations of the objects (including their spatial dimensions) and velocities of the objects (e.g., using the Doppler shift technology). Hereinafter, "velocity" refers to both how fast the object is moving (the speed of the object) as well as the direction of the object's motion. The sensing system 110 can include a lidar 112, which can be a laser-based unit capable of determining distances to the objects and velocities of the objects in the driving environment 101. Each of the lidar 112 and radar 114 can include a coherent sensor, such as a frequency-modulated continuous-wave (FMCW) lidar or radar sensor. For example, radar 114 can use heterodyne detection for velocity determination. In some implementations, the functionality of a ToF and coherent radar is combined into a radar unit capable of simultaneously determining both the distance to and the radial velocity of the reflecting object. Such a unit can be configured to operate in an incoherent sensing mode (ToF mode) and/or a coherent sensing mode (e.g., a mode that uses heterodyne detection) or both modes at the same time. In some implementations, multiple lidars 112 or radars 114 can be mounted on AV 100.

Lidar 112 can include one or more light sources producing and emitting signals and one or more detectors of the signals reflected back from the objects. In some implementations, lidar 112 can perform a 360-degree scanning in a horizontal direction. In some implementations, lidar 112 can be capable of spatial scanning along both the horizontal and vertical directions. In some implementations, the field of view can be up to 90 degrees in the vertical direction (e.g., with at least a part of the region above the horizon being scanned with radar signals). In some implementations, the field of view can be a full sphere (consisting of two hemispheres).

The sensing system 110 can further include one or more cameras 118 to capture images of the driving environment 101. The images can be two-dimensional projections of the driving environment 101 (or parts of the driving environment 101) onto a projecting surface (flat or non-flat) of the camera(s). Some of the cameras 118 of the sensing system 110 can be video cameras configured to capture a continuous (or quasi-continuous) stream of images of the driving environment 101. The sensing system 110 can also include one or more infrared (IR) sensors 119. The sensing system 110 can further include one or more sonars 116, which can be ultrasonic sonars, in some implementations.

The sensing data obtained by the sensing system 110 can be processed by a data processing system 120 of AV 100. For example, the data processing system 120 can include a perception and planning system 130. The perception and planning system 130 can be configured to detect and track objects in the driving environment 101 and to recognize the detected objects. For example, the perception and planning system 130 can analyze images captured by the cameras 118 and can be capable of detecting traffic light signals, road signs, roadway layouts (e.g., boundaries of traffic lanes, topologies of intersections, designations of parking places, and so on), presence of obstacles, and the like. The perception and planning system 130 can further receive radar sensing data (Doppler data and ToF data) to determine distances to various objects in the environment 101 and velocities (radial and, in some implementations, transverse, as described below) of such objects. In some implementations, the perception and planning system 130 can use radar data in combination with the data captured by the camera(s) 118, as described in more detail below.

Perception and planning system 130 can include an object detection model 132 that deploys one or more suitable computer vision models to identify regions in driving environment 101 that depict individual objects, classify objects by type (e.g., vehicles, pedestrians, animals, and/or the like) and identify objects of interest, including VRUs and VRU types 254, e.g., a pedestrian, a bicyclist, a motorcyclist, a scooter rider, a skateboard rider, a wheelchair rider, and/or the like. Object detection model 132 can crop camera/lidar/radar images into portions (also referred to as patches herein) of images associated with these individual VRUs.

Perception and planning system 130 can further include a tracking and prediction component 134 to monitor how the driving environment 101 evolves with time, e.g., by determining and monitoring locations and velocities of various objects identified by object detection model 132. In some implementations, tracking and prediction component 134 can keep track of the changing appearance of the environment due to motion of the AV relative to the environment. In some implementations, tracking and prediction component 134 can make predictions about how various tracked objects of the driving environment 101 will be positioned within a prediction time horizon. The predictions can be based on the current locations and velocities of the tracked objects as well as on the earlier locations and velocities (and, in some cases, accelerations) of the tracked objects. For example, based on stored data (referred as "track" herein) for object 1 indicating location/velocity of object 1 during the previous 3-second period tracking and prediction component 134 can conclude that object 1 is maintaining a constant speed. Accordingly, tracking and prediction component 134 can predict where object 1 is likely to be within the next 3 or 5 seconds of motion. As another example, based on track for object 2 indicating decelerated motion of object 2 approaching a road intersection over the previous 2-second period, tracking and prediction component 134 can conclude that object 2 is about to come to a stop sign before making a turn to a side road. Accordingly, tracking and prediction component 134 can predict where object 2 is likely to be within the next 1 or 3 seconds. The tracking and prediction component 134 can perform periodic checks of the accuracy of its predictions and modify the predictions based on new data obtained from the sensing system 110.

Perception and planning system 130 can further include a reference point detection 135 model that determines locations of various reference points of VRUs detected by object detection model 132 (and tracked by tracking and prediction component 134). Example reference points can include various skeletal points of VRUs, facial features of VRU, and/or the like. Perception and planning system 130 can further include an LoC detection 138 that determines, based on the reference points, various LoC metrics, e.g., dynamics of the height differentials D(t) between two or more reference points of a VRU. LoC detection 138 can determine whether the dynamics of the height differentials D(t) satisfies one or more threshold conditions to estimate a likelihood of an LoC event. Additionally, LoC detection 138 can use an input of a prone state detection 136 model that processes cropped images of VRUs and outputs a prone state score S vor individual VRUs indicative of a likelihood that the VRUs are in a prone position, e.g., lying on the ground or in the process of sliding, falling, and/or the like. Based on the dynamics of the height differential(s) $\Delta(t)$, prone state score S(t), and/or additional information, such as the acceleration a(t), LoC detection 138 can determine whether the VRU has lost control, is in the process of losing control, or at the risk of losing control of its motion.

Perception and planning system 130 can further receive information from a positioning subsystem 122, which can include a GPS transceiver and/or inertial measurement unit (IMU), configured to obtain information about the position of the AV relative to Earth and its surroundings. The positioning subsystem can use the positioning data, e.g., GPS and IMU data) in conjunction with the sensing data to help accurately determine the location of the AV with respect to fixed objects of the driving environment 101 (e.g., roadways, lane boundaries, intersections, sidewalks, crosswalks, road signs, curbs, surrounding buildings, etc.) whose locations can be provided by roadgraph information 124. In some implementations, the data processing system 120 can receive non-electromagnetic data, such as audio data (e.g., ultrasonic sensor data, or data from a mic picking up emergency vehicle sirens), temperature sensor data, humidity sensor data, pressure sensor data, meteorological data (e.g., wind speed and direction, precipitation data), and the like.

Various systems and subsystems of data processing system 120 can have software stored in one or more system memory 126 devices. System memory 126 can include any volatile or non-volatile memory devices, such as read-only memory (ROM), random-access memory (RAM), electrically erasable programmable read-only memory (EEPROM), flash memory, flip-flop memory, or any other device capable of storing data. RAM can be a dynamic random-access memory (DRAM), synchronous DRAM (SDRAM), a static memory, such as static random-access memory (SRAM), and the like. In some implementations, system memory 126 can be an on-chip memory.

Operations of data processing system 120 can be performed by one or more processors 128, which can include CPU(s), GPU(s), field-programmable gate arrays (FPGAs), application-specific integrated circuits (ASICs), and the like. "Processor" herein refers to a device capable of executing instructions encoding arithmetic, logical, or I/O operations, e.g., stored in system memory 126. In some implementations, processor(s) 128 and the system memory 126 can be implemented as a single controller, e.g., as a FPGA.

The data generated by the perception and planning system 130, including positional subsystem 122, object detection model 132, tracking and prediction component 134, reference point detection 135, prone state detection 136, LoC detection 138, and/or other systems and components can be used by an autonomous driving system, such as a vehicle control system (VCS) 140. The VCS 140 can include one or more algorithms that control how AV is to behave in various driving situations and environments. For example, the VCS 140 can include a navigation system for determining a global driving route to a destination point. The VCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The VCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of VCS 140 can generate instructions for various systems and components of the vehicle, such as the powertrain, brakes, and steering 150, vehicle electronics 160, signaling 170, and other systems and components not explicitly shown in FIG. 1. The powertrain, brakes, and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the VCS 140 can be delivered directly to the powertrain, brakes, and steering 150 (or signaling 170)

whereas other instructions output by the VCS 140 are first delivered to the vehicle electronics 160, which generates commands to the powertrain, brakes, and steering 150 and/or signaling 170.

In one example, the perception and planning system 130 can determine that a VRU identified by the data processing system 120 has lost control of its motion (e.g., is slipping, falling, losing balance, and/or the like) and has to be avoided, e.g., by decelerating the AV until a safe speed is reached and/or by steering the AV vehicle away from the VRU, e.g., away from the sidewalk, pedestrian crossing, lane of travel of the VRU, if the VRU is a motorcyclist, cyclist, scooter rider, etc. The VCS 140 can output instructions to the powertrain, brakes, and steering 150 (directly or via the vehicle electronics 160) to: (1) reduce, by modifying the throttle settings, a flow of fuel to the engine to decrease the engine rpm; (2) downshift, via an automatic transmission, the drivetrain into a lower gear; (3) engage a brake unit to reduce (while acting in concert with the engine and the transmission) the vehicle's speed until a safe speed is reached; and (4) perform, using a power steering mechanism, a steering maneuver to steer away from the VRU. Subsequently, the VCS 140 can output instructions to the powertrain, brakes, and steering 150 to resume the previous speed settings of the vehicle.

Figure 2A:
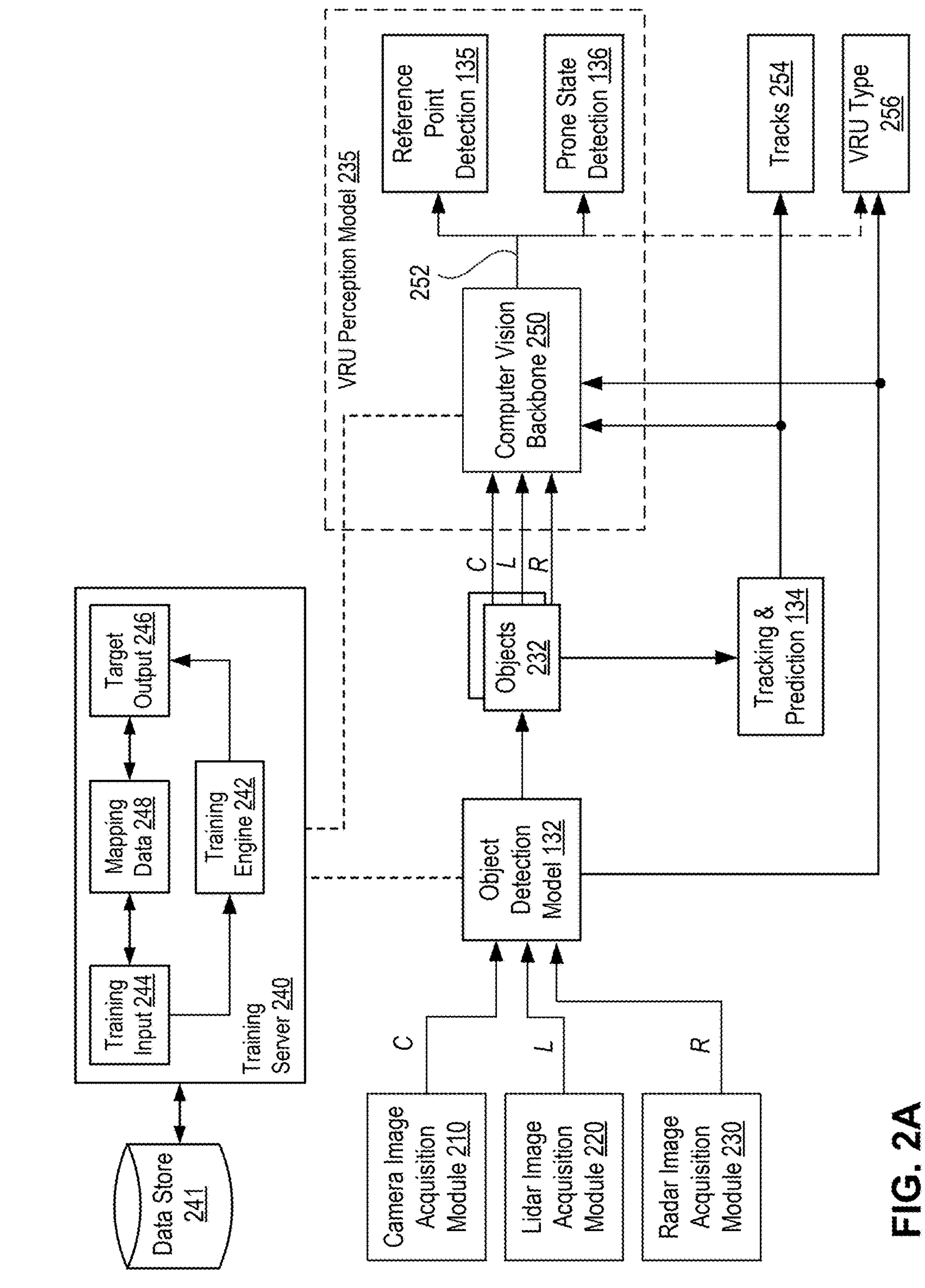
FIG. 2A is a diagram illustrating a first stage of an example architecture of a part of a vehicle's perception and planning system capable of identifying VRUs that are at risk of LoC in driving environments, in accordance with some implementations of the present disclosure.

FIG. 2A is a diagram illustrating a first stage 200 of an example architecture of a part of a vehicle's perception and planning system capable of identifying VRUs that are at risk of LoC in driving environments, in accordance with some implementations of the present disclosure. As illustrated, an input into the perception and planning system (e.g., perception and planning system 130 of FIG. 1) can include data obtained by sensing system 110, e.g., by lidar 112, radar 114, and/or camera(s) 118. The obtained data can be provided to the perception and planning system 130 by a camera image acquisition module 210, a lidar data acquisition module 220, and/or radar data acquisition module 230. More specifically, camera image acquisition module 210 can acquire a sequence of camera images, e.g., two-dimensional projections of the driving environment (or a portion thereof) on an array of sensing detectors (e.g., charged coupled device or CCD detectors, complementary metal-oxide-semiconductor or CMOS detectors, and/or the like). Each camera image can have pixels of various intensities of one color (for black-and-white images) or multiple colors (for color images). The camera images can be panoramic images or images depicting a specific portion of the driving environment. The camera images can include a number of pixels. The number of pixels can depend on the resolution of the image. Each pixel can be characterized by one or more intensity values. A black-and-white pixel can be characterized by one intensity value, e.g., representing the brightness of the pixel, with value 1 corresponding to a white pixel and value 0 corresponding to a black pixel (or vice versa). The intensity value can assume continuous (or discretized) values between 0 and 1 (or between any other chosen limits, e.g., 0 and 255). Similarly, a color pixel can be represented by more than one intensity value, such as three intensity values (e.g., if the RGB color encoding scheme is used) or four intensity values (e.g., if the CMYK color encoding scheme is used). Camera images can be preprocessed, e.g., downscaled (with multiple pixel intensity values combined into a single pixel value), upsampled, filtered, denoised, and the like. Camera image(s) can be in any suitable digital format (JPEG, TIFF, GIG, BMP, CGM, SVG, and so on).

A lidar image acquisition module 220 (and, similarly, radar image acquisition module 230) can provide lidar (radar) images, which can include a set of return points (point cloud) corresponding to laser (radar) beam reflections from various objects in the driving environment. Each return point can be understood as a data unit (pixel) that includes coordinates of reflecting surfaces, radial velocity data, intensity data, and/or the like. For example, lidar image acquisition module 220 (radar image acquisition module 230) can provide the images that includes the intensity map $I(R, \theta, \phi)$, where $R$, $\theta$, $\phi$ is a set of spherical coordinates. In some implementations, Cartesian coordinates, elliptic coordinates, parabolic coordinates, or any other suitable coordinates can be used instead. The intensity map identifies an intensity of the lidar (radar) reflections for various points in the field of view. The coordinates of objects (or surfaces of the objects) that reflect lidar (radar) signals can be determined from directional data (e.g., polar $\theta$ and azimuthal $\phi$ angles in the direction of lidar transmissions) and distance data (e.g., radial distance $R$ determined from the time of flight of lidar signals). The lidar and/or radar images can further include velocity data of various reflecting objects identified based on detected Doppler shift of the reflected signals. Although FIG. 2A illustrates an implementation in which three data acquisition modules are deployed, one or more data acquisition modules can be absent (or disabled) in some implementations. For example, the camera image acquisition module 210 and the lidar (or radar) image acquisition module 220 can be deployed while the radar image acquisition module 230 (or lidar image acquisition module 220) is not deployed.

The camera (C) images, lidar (L) images, and/or radar (R) images can be large images of the entire driving environment or images of a significant portion of the driving environment (e.g., camera image acquired by a forward-facing camera(s) of the vehicle's sensing system). The acquired camera, lidar, and/or radar images can be processed by an object detection model 132, e.g., a model (or multiple models) trained to identify individual objects 232 in the driving environment and crop camera/lidar/radar images into portions (also referred to as patches herein) of the images associated with the individual objects 232. Object detection model 132 can be (or include) any suitable computer vision model, e.g., a machine learning model trained to identify regions that include objects of interest, e.g., vehicles, pedestrians, animals, road signs, buildings, structures, overpasses, and/or the like.

Objects identified by object detection model 132 can be tracked by tracking and prediction component 134, which can maintain and update various geo-motion data related to the motion of the objects between different timestamp $t_j$, e.g., $\vec{R}(t_j)$, velocity $\vec{V}(t_j)$, acceleration $\vec{\alpha}(t_j)$, angular velocity $\vec{\omega}(t_j)$, and/or the like. In some implementations, tracking and prediction component 134 can deploy a suitable statistical filter, e.g., Kalman filter. Kalman filter can compute: (i) a most probable geo-motion data in view of the measurements obtained (e.g., of visible locations, Doppler velocity, and/or the like), (ii) predictions made according to a physical model of object's motion, and (ii) statistical assumptions about measurement errors (e.g., covariance matrix of errors). Based on this collected data, tracking and prediction component 134 can estimate, for a certain time horizon (e.g., one or several second), an accurate future motion of the object.

Camera (C), lidar (L), and/or radar (R) image patches cropped using object detection model 132 can be provided to a VRU perception model 235 that uses the provided patches to identify one or more LoC metrics associated with a state of a given VRU. The state of a VRU refers to a set of detected reference points of the VRU, a score indicating a likelihood that the VRU is in a prone state, and/or other metrics that can be indicative of an occurring or impending loss of control by the VRU. In some implementations, VRU perception model 235 can include a computer vision backbone 250 that generates one or more intermediate features (feature vectors, embeddings, etc.) 252 representative of the content of the input patches and multiple classification networks (heads), e.g., reference point detection 135 network, prone state detection 136 network, and/or the like that process the intermediate features 252 and output LoC metrics for the VRU. In some implementations, computer vision backbone 250 can process additional inputs, e.g., tracks 254 of VRUs (provided by tracking and prediction components 134), VRU types 256 (determined by object detection model 132), and/or other suitable inputs.

In some implementations, as illustrated with the dashed arrow in FIG. 2A, VRU type 256 can be determined by an additional classifier of VRU perception model 235 processing the intermediate features 252 generated by computer vision backbone 250.

In some implementations, VRU perception model 235 can use decision-tree algorithms, support vector machines, deep neural networks, and the like. Deep neural networks can include convolutional neural networks, recurrent neural networks (RNN) with one or more hidden layers, fully connected neural networks, long short-term memory neural networks, Boltzmann machines, attention-based networks, transformer networks, and/or the like.

Object detection model 132 and/or VRU perception model 235 can be trained using actual camera images, lidar images, and/or radar images depicting VRUs present in various driving environments, e.g., urban driving environments, highway driving environments, rural driving environments, off-road driving environments, and/or the like. Training can be performed by a training engine 242 hosted by a training server 240, which can be an outside server that deploys one or more processing devices, e.g., central processing units (CPUs), graphics processing units (GPUs), and/or the like. In some implementations, object detection model 132 and/or VRU perception model 235 can be trained by training engine 242 and subsequently downloaded onto the perception system of the AV. Object detection model 132 and/or VRU perception model 235, as illustrated in FIG. 2A, can be trained using training data that includes training inputs 244 and corresponding target outputs 246 (correct matches for the respective training inputs 244). During training of object detection model 132 and/or VRU perception model 235 (including training computer vision backbone 250 and various classification heads), training engine 242 can find patterns in the training data that maps training inputs 244 to the target outputs 246.

Training engine 242 can have access to a data store 241 storing multiple camera images, lidar images, and/or radar images for actual driving situations in a variety of environments. Training inputs 244 can be annotated with labels or some other suitable mapping data 248 (ground truth annotations), that map training inputs 244 to the corresponding target outputs 246.

Stored training inputs 244 can include large datasets (e.g., with hundreds or thousands of images or more) that include cropped camera image/lidar/radar patches. In some implementations, ground truth annotations can be made by a developer before the annotated training inputs are stored in the data store 241. During training, training server 240 can retrieve annotated training data from the data store 241, including one or more training inputs 244 and one or more target outputs 246 mapped by mapping data 248. For example, training of object detection model 132 can be performed using images of pedestrians, vehicles, traffic signs, road markings (e.g., lane markings), and/or other objects as training inputs 244 and labels identifying types and bounding boxes for the objects as target outputs 246 (ground truth). Similarly, training of reference point detection 135 model (or classifier) can be performed using cropped images of VRUs as training inputs 244 and various developer-marked reference points (e.g., skeletal, facial, etc.) as target outputs 246. Training of prone state detection 136 model (or classifier) can be performed using cropped images of VRUs as training inputs 244 and various developer-assigned prone state scores S as target outputs 246. Assigned prone state scores S can range from 0 (in one non-limiting example) for upright VRUs to 1 for VRUs lying on the ground, with intermediate values indicating VRU beginning to lose control (e.g., S=0.25), in the process of falling (e.g., S=0.5), making contact with ground, e.g., sitting (S=0.75), and/or any other suitable set of prone state scores.

During training of object detection model 132 and/or VRU perception model 235, training engine 242 can change parameters (e.g., weights and biases) of object detection model 132 and/or VRU perception model 235 until the models successfully learn how to predict correct target outputs 246. In some implementations, object detection model 132 and/or VRU perception model 235 can be trained separately. In various implementations, more than one VRU perception model 235 can be trained to be used under different conditions and for different driving environments, e.g., separate VRU perception model 235 can be trained for detection of loss of control of pedestrians, bicyclists, motorcyclists, and/or the like. Different VRU perception models 235 can have different architectures (e.g., different numbers of neuron layers and different topologies of neural connections), different settings (e.g., activation functions, etc.), and can be trained using different sets of hyperparameters.

Data store 241 can be a persistent storage capable of storing lidar data, camera images, as well as data structures configured to facilitate accurate and fast identification and validation of sign detections, in accordance with various implementations of the present disclosure. Data store 241 can be hosted by one or more storage devices, such as main memory, magnetic or optical storage disks, tapes, or hard drives, network-attached storage (NAS), storage area network (SAN), and so forth. Although depicted as separate from training server 240, in some implementations, data store 241 can be a part of training server 240. In some implementations, data store 241 can be a network-attached file server, while in other implementations, data store 241 can be some other type of persistent storage such as an object-oriented database, a relational database, and so forth, that can be hosted by a server machine or one or more different machines accessible to the training server 240 via a network (not shown in FIG. 2A).

Figure 3A:
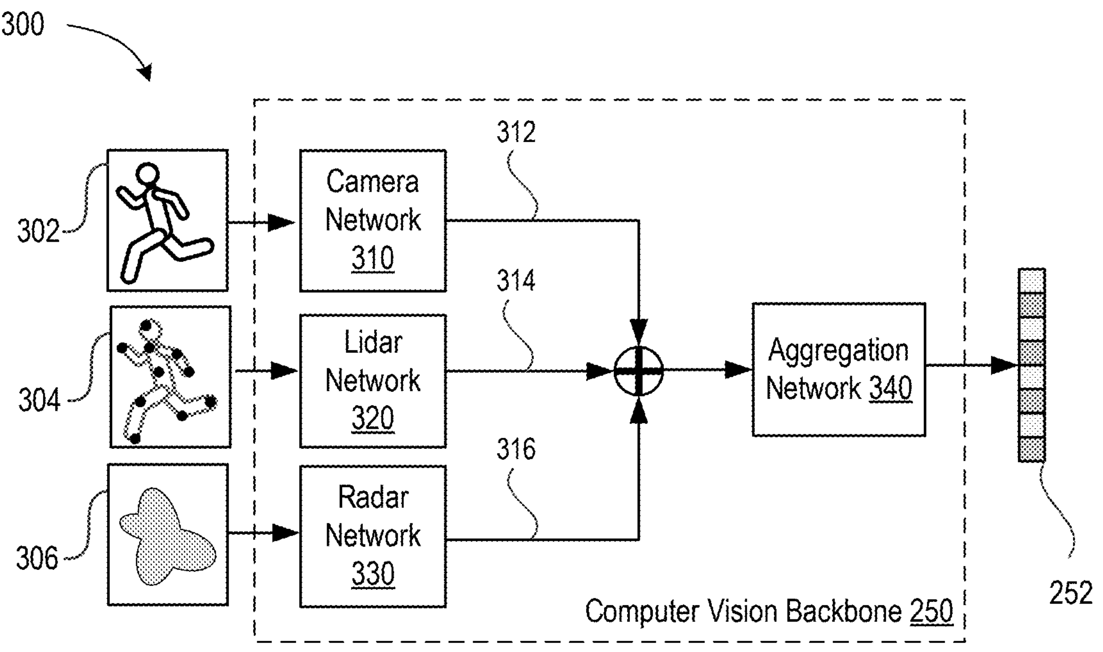
FIG. 3A illustrates one example late-fusion architecture of the computer vision backbone of the VRU perception model of FIG. 2A, in accordance with some implementations of the present disclosure.

FIG. 3A illustrates one example late-fusion architecture 300 of the computer vision backbone 250 of the VRU perception model 235 of FIG. 2A, in accordance with some implementations of the present disclosure. As illustrated, a camera network 310, a lidar network 320, and a radar network 330 can be configured and trained to process input data of the corresponding modalities. For example, camera network 310 can process a camera patch 302 associated with an individual VRU (e.g., a pedestrian) and generate a camera embedding 312 that constitutes a digital representation of various appearance features of the VRU in the patch. During training, camera network 310 learns how to efficiently encode appearance features via camera embeddings 312. Camera embedding 312 can have 256 bits, 512 bits, 1024 bits, or some other number of bits that can be set empirically, e.g., together with architecture of camera network 310, based on experimentation, to determine the optimal value of bits for a given target environment. In some implementations, camera network 310 can be (or include) a neural network of artificial neurons. The neurons can be associated with learnable weights and biases. The neurons can be arranged in layers. Some of the layers can be hidden layers. Camera network 310 can include multiple hidden neuron layers and can be configured to perform computations that enable detection of a state of the VRUs. In some implementations, camera network 310 can include multiple convolutional layers with suitable learned parameters, including kernel/mask size, kernel/mask weights, sliding step size, and the like. Convolutional layers can alternate with padding layers and can be followed with one or more pooling layers, e.g., maximum pooling layers, average pooling layers, and the like. Some of the layers of camera network 310 can be fully connected layers. In some implementations, camera network 310 can be a network of fully connected layers, a convolutional neural network, a recurrent neural network (RNN), a long short-term model (LSTM), a network with attention, a transformer network, and/or the like, or some combination thereof.

Similarly, the lidar network 320 can process a lidar patch 304 for the same VRU and generate a lidar embedding 314. The radar network 330 can likewise process a radar patch 306 and generate a radar embedding 316 for the VRU. Lidar embedding 314/radar embedding 316 constitute digital representations of respective portions of the lidar/radar point cloud captured by the lidar/radar patches. Training causes lidar network 320 (and/or radar network 330) to generate lidar embeddings 314 (radar embeddings 316) that efficiently represent respective data for the captured object. Lidar embeddings 314 (radar embeddings 316) can have the same number of bits as camera embeddings 312. In some implementations, the number of bits of lidar embeddings 314 (radar embeddings 316) can be different from the number of bits of camera embeddings 312. In some implementations, lidar network 320 (and/or radar network 330) can have a U-net architecture, in which a convolutional subnetwork (encoder) downsizes features of the lidar patch (and/or radar patch) along its height and width dimensions and increases the size along the feature dimension. A deconvolutional network (decoder) then expands the features along the width and height dimensions while simultaneously reducing the feature dimension.

In some implementations, various additional network architectures or variations of network architectures can be used to implement camera network 310, lidar network 320, and/or radar network 330, such as networks with residual connections, networks with multiple paths, networks with attention (self-attention and cross-attention), transformer networks, convolutional neural networks with sparse convolutions, and/or the like.

Camera embedding 312 can be combined with lidar embedding 314 and can further be combined with radar embedding 316 (e.g., concatenated or otherwise aggregated) and the combined embeddings can be processed by an aggregation network 340 that outputs intermediate features 252.

Figure 3B:
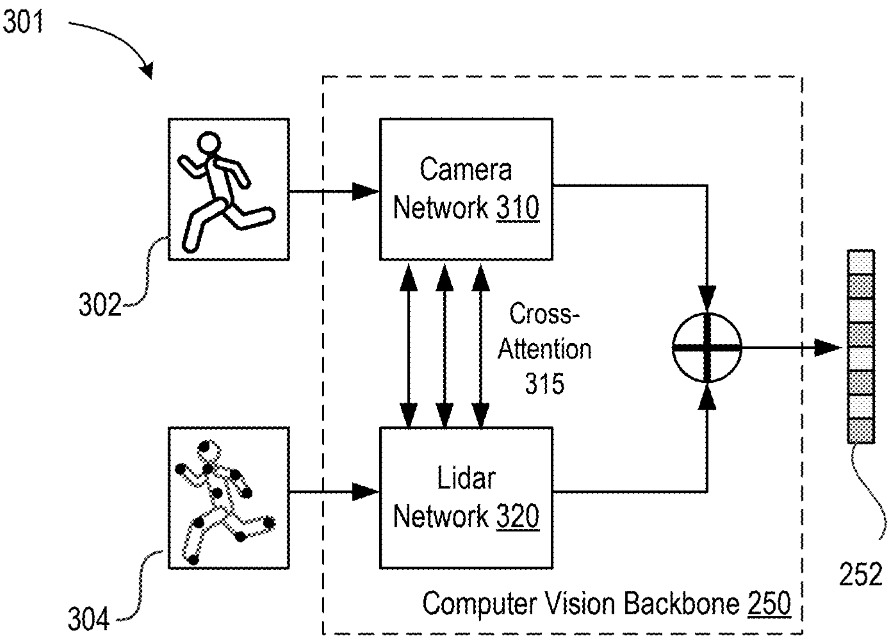
FIG. 3B illustrates one example early-fusion architecture of the computer vision backbone of the VRU perception model of FIG. 2A, in accordance with some implementations of the present disclosure.

FIG. 3B illustrates one example early-fusion architecture 301 of the computer vision backbone 250 of the VRU perception model 235 of FIG. 2A, in accordance with some implementations of the present disclosure. The computer vision backbone 250 with early-fusion architecture 301 processes the camera patch 302 using a self-attention camera network 310. The computer vision backbone 250 with early-fusion architecture 301 also processes the lidar patch 304 using a self-attention lidar network 320. Each of self-attention camera network 310 and self-attention lidar network 320 transforms the corresponding inputs into embeddings by identifying information that is not only carried by individual pixels (or groups of pixels) of the corresponding images but also by extracting information that is present in correlations of pixels (or groups of pixels). For example, relative arrangement of pixels depicting arms of a bicyclist and wheels of the bicycle carries important information about the state of the bicyclist (e.g., whether the bicyclist is maintaining or losing control of the bicycle). In addition to the self-attention mechanisms used in processing of camera patch 302 and lidar patch 304, a cross-attention mechanism 315 learns cross-correlations between camera pixels and lidar pixels, starting from early stages of the embedding generation. In some implementations, the self-attention and the cross attention in early-fusion networks can be implemented using one or more transformer blocks that treat pixels (or groups of pixels) as query-key-value groups. Although, for brevity, the early-fusion architecture 301 is illustrated for an example, computer vision backbone 250 processing camera and lidar inputs, in some implementations, early fusion backbones can also process radar inputs or other additional inputs, with cross-attention mechanism 315 learning cross-correlations between various pairs of input modalities (e.g., camera-lidar cross-correlations, camera-radar cross-correlations, lidar-radar cross-correlations, and/or the like).

With further reference to FIG. 2A, in some implementations, processing by the computer vision backbone 250 can be performed individually for each frame of the input data, e.g., camera/lidar/radar patches collected for a given timestamp $t_j$. In some implementations, the computer vision backbone 250 can simultaneously process a sliding window of frames $t_1, t_2, \ldots t_N$ of the input data, with the window sliding by a certain (stride) number M of frames (e.g., $M \leq N$) at each processing iteration. In one example non-limiting implementations, the sliding window can include N=10 frames spaced with $t_{j+1}-t_j=0.1$ s intervals with the stride of the sliding window being M=2 frames, such that an updated set of processed frames is processed every 0.2 seconds with two new frames added to the previous set of frames and two oldest frames removed from the set of processed frames, in one non-limiting example.

Reference point detection 135 can be (or include) a classifier network, e.g., a network having two or more fully-connected layers, which uses intermediate features 252 as input, and outputs coordinates of various reference points for the VRUs. In some implementations, the reference points can be represented by their coordinates and predicted labels, e.g., Output={x, y, z; Label}. The labels Label can include "nose," "top of head," "chin," "left ear," "right ear," "left shoulder," "right shoulder," "left hip," "right hip," "left knee," "right knee," "left ankle," "right ankle," and/or any labels that reference point detection 135 is trained to recognize. In some implementations, coordinates x, y, z can be Cartesian coordinates. In other implementations, coordinates x, y, z can be spherical coordinates, cylindrical coordinates, or any other suitable coordinates. Coordinates x, y, z can be determined using various position-aware data used as input into reference point detection 135 and/or computer vision backbone 250, e.g., lidar data that includes accurate distance to and bearing angle to a given reference point or camera data that can include accurate bearing angle with the distance determined using a suitable mapping from a perspective camera view to a global system of coordinates. Reference point detection 135 can select one or more upper-body reference points (e.g., at height $z_{upper}$) and one or more lower-body reference points (e.g., at height $z_{lower}$) and compute respective height differential(s), $D=z_{upper}-z_{lower}$. For example, in the instances of a pedestrian walking (or a bicyclist riding) towards the sensing system (e.g., an autonomous vehicle sensing system) or sideways to the sensing system, the upper-body reference points can include the nose, chin, top of the head, etc. and the lower-body reference points can include the ankle(s), knee(s), etc. In the instances of a pedestrian walking (or a bicyclist riding) away from the sensing system, the upper-body reference points can include ears, top of the head, center of the head, etc. and the lower-body reference points can include heel(s), ankle (s), knee(s), etc.

Figure 4A:
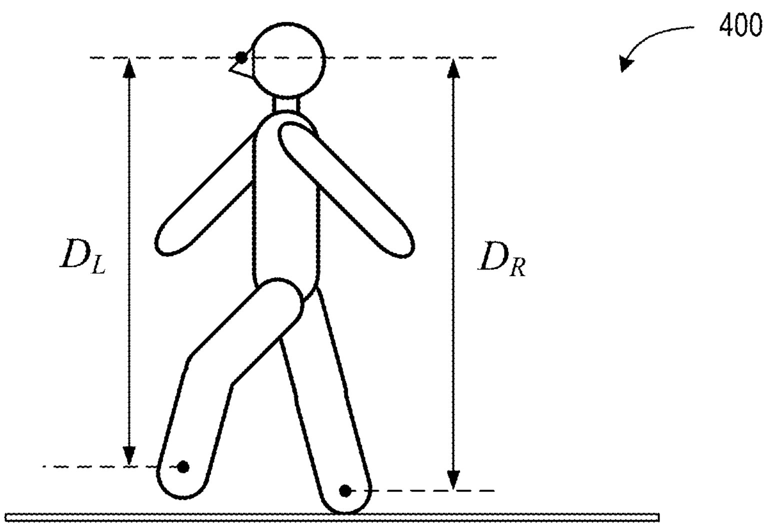
FIGS. 4A-4C illustrate tracking reference points of a walking pedestrian as part of a loss-of-control monitoring of VRUs in driving environments, in accordance with some implementations of the present disclosure.
Figure 4B:
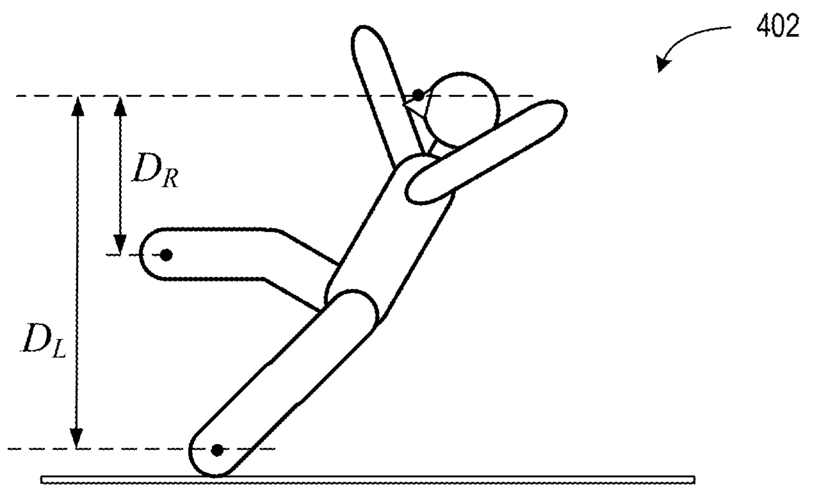
Figure 4C:
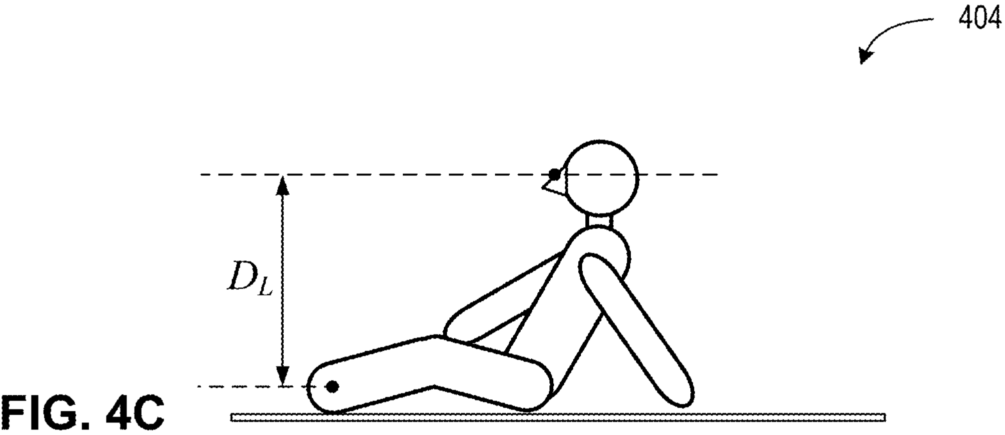

FIGS. 4A-4C illustrate tracking reference points of a walking pedestrian as part of a loss-of-control monitoring of VRUs in driving environments, in accordance with some implementations of the present disclosure. FIG. 4A illustrates a walking pedestrian 400 maintaining control of the motion. Height differential $D_L$, e.g., as can be identified by reference point detection 135 of FIG. 2A, indicates the vertical distance between the nose of the pedestrian (upper-body reference point) and the left ankle of the pedestrian (lower-body reference point). Similarly, height differential $D_R$ indicates vertical distance between the nose of the pedestrian and the right ankle of the pedestrian. FIG. 4B illustrates a pedestrian 402 at an onset of an LoC event (slip and fall) with the height differentials $D_L$ and $D_R$ experiencing a sudden reduction compared with the walking pedestrian 400 not experiencing an LoC. The onset of the LoC event illustrated in FIG. 4B is also accompanied with a substantial deceleration of the pedestrian whose forward motion is halted at the start of the fall. FIG. 4C illustrates a pedestrian 404 in an aftermath of an LoC. Pedestrian 404 is sitting of the ground with the height differential $D_L$ between the nose and the left ankle further reduced, and the right ankle not visible from the vantage point of the sensing system.

With further reference to FIG. 2A, intermediate features 252 may be processed by prone state detection 136, which may be (or include) another classifier network that outputs a prone state score S for a VRU depicted in the patch(es) used as an input into the VRU perception model 235. Prone state score S can be a continuous value within a certain predefined range (set as part of training of prone state detection 136), e.g., a value between S=0, corresponding to a fully upright state of the VRU, and S=1, corresponding to a fully prone state of the VRU.

Figure 5A:
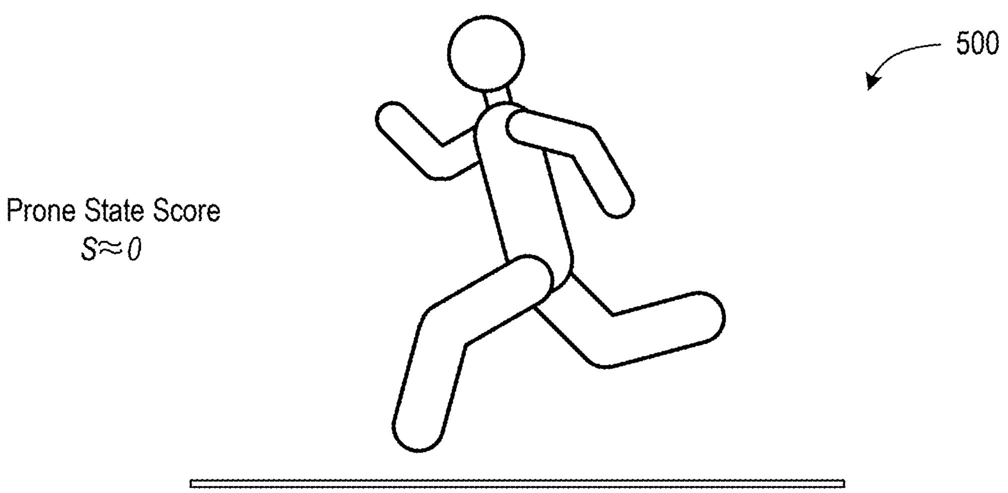
FIGS. 5A-5C illustrate a prone state detection for a running pedestrian as part of loss-of-control monitoring of VRUs in driving environments, in accordance with some implementations of the present disclosure.
Figure 5B:
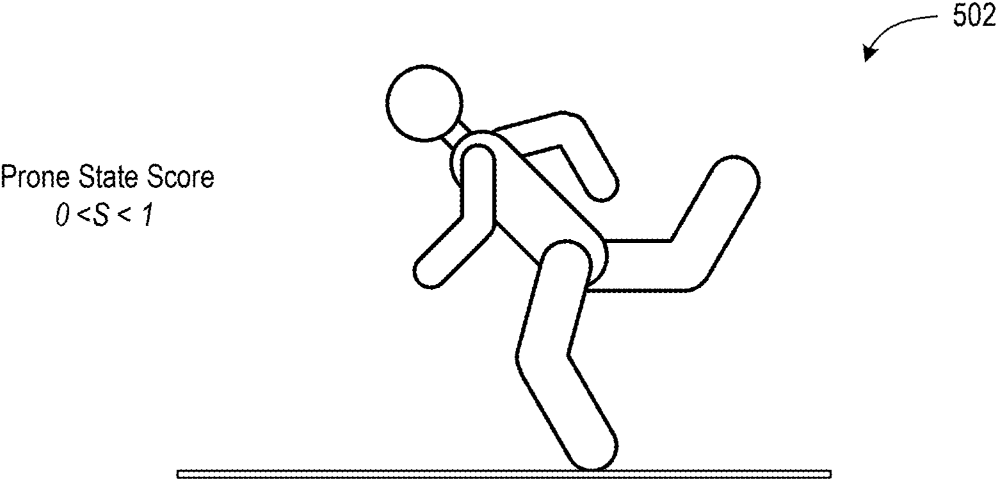
Figure 5C:
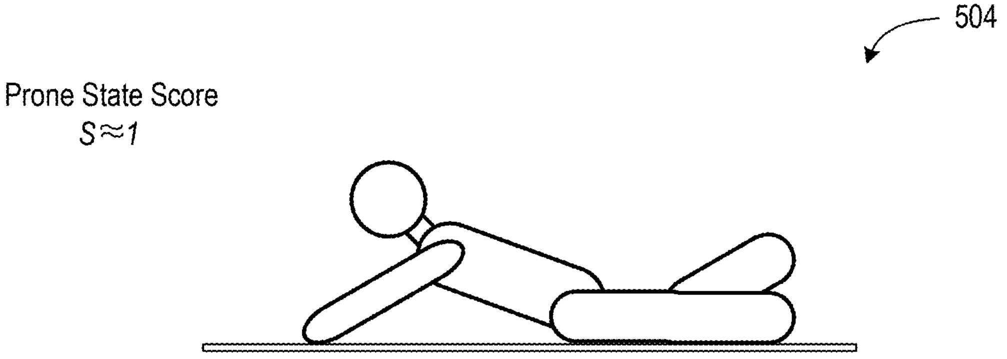

FIGS. 5A-5C illustrate a prone state detection for a running pedestrian as part of loss-of-control monitoring of VRUs in driving environments, in accordance with some implementations of the present disclosure. FIG. 5A illustrates a running pedestrian 500 maintaining control of the motion in an upright position associated with a prone state score that is close to S=0. FIG. 5B illustrates the running pedestrian 502 beginning to lose control (e.g., because of a mispositioning the leg making contact with the pavement) and excessively leaning forward. The prone state score for the running pedestrian 504 can be substantially above the upright score S=0 but still substantially less than the fully prone score S=0. FIG. 5C illustrates a pedestrian 504 in a substantially prone position with the prone state score close to S=1, e.g., following a fall by the pedestrian 502 of FIG. 5B.

Figure 2B:
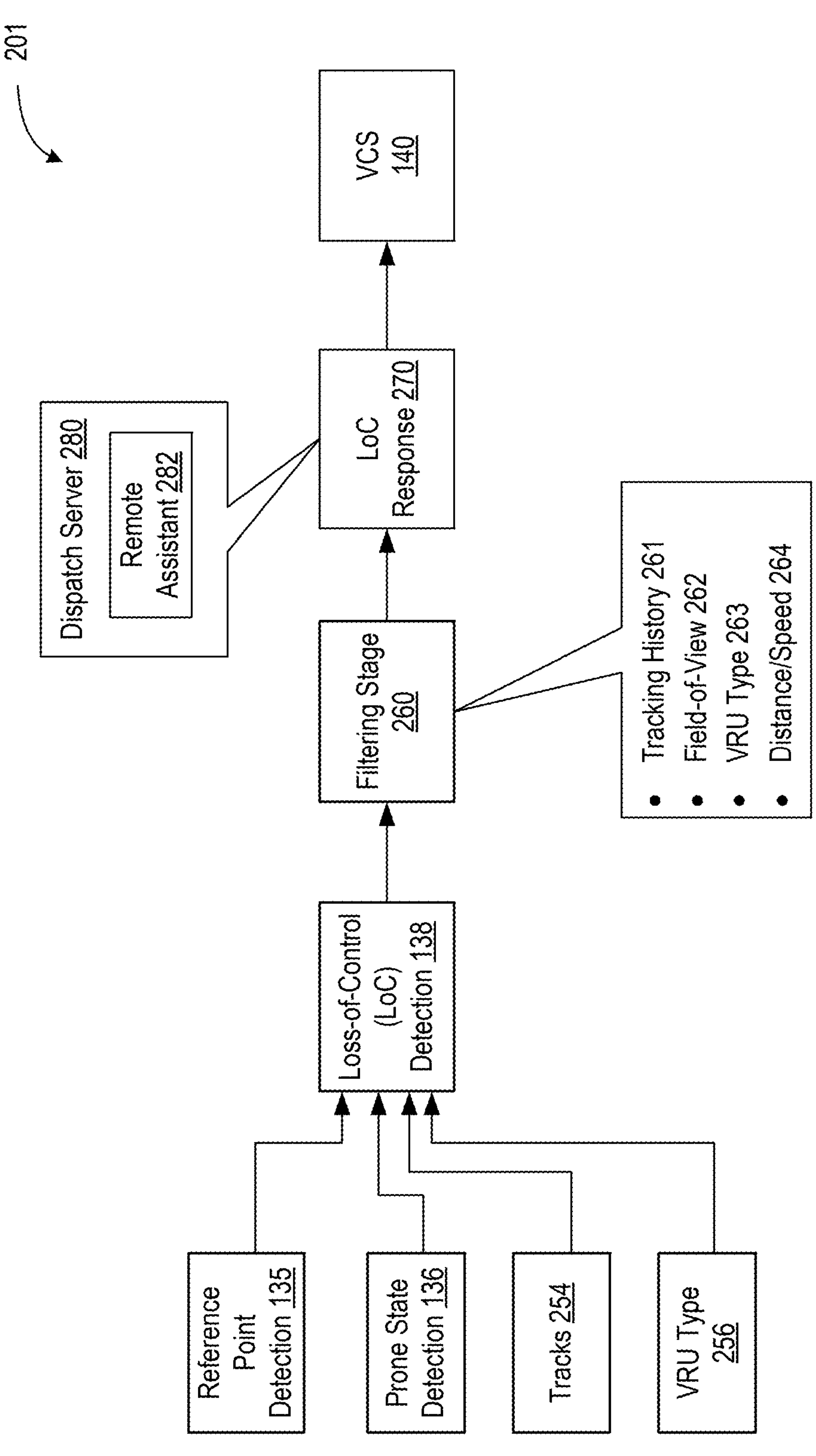
FIG. 2B is a diagram illustrating a second stage of the example architecture of the part of the vehicle's perception system capable of identifying VRUs that are at risk of LoC in driving environments, in accordance with some implementations of the present disclosure.

FIG. 2B is a diagram illustrating a second stage 201 of the example architecture of the part of the vehicle's perception system capable of identifying VRUs that are at risk of LoC in driving environments, in accordance with some implementations of the present disclosure. The second stage 201 can include an LoC detection 138. In some implementations, LoC detection 138 can be a component that deploys one or more heuristics, formulas, tables, and/or the like. In some implementations, LoC detection 138 can include one or more decision tree algorithms and/or other machine learning techniques, including but not limited to support vector machines.

In various implementations, LoC detection 138 can use, as inputs, one or more of reference point detection 135, prone state detection 136, tracks 254 of detected VRUs, VRU types 256, and/or the like. In some implementations, LoC detection can form one or more LoC metrics, including but not limited to one or more height differentials $\{D_j\}=D_1, D_2, \ldots D_N$ between various pairs of reference points outputted by reference point detection 135, e.g., the height differentials $D_L$ and $D_R$ between some upper body reference features (e.g., nose, ears, chin, top of the head, shoulders, etc.) and some lower-body reference features (e.g., knees, hips, etc.). In some implementations, multiple differentials can be aggregated, e.g., $D_1, D_2, \ldots D_N \rightarrow D_{agg}$ into fewer (e.g. one) aggregated differentials to reduce variations in the reference features occurring in the normal course of motion. For example, an average of nose-ankle differentials may be computed, $D_{agg}=(D_L+D_R)/2$, which can be a more stable representation of a bicyclist's or pedestrian's footwork. In some implementations, multiple aggregated differential can be computed, e.g., one aggregated differential can be computed to represent nose-ankle differentials and another aggregated differential can be used to represent shoulder-knee differentials. In some implementations, differentials of different average magnitudes (e.g., ear-ankle and shoulder-hip differentials) can nonetheless be aggregated, e.g., by rescaling the ratios of the differentials and the corresponding averages $\langle D_j \rangle$ over a certain time of observation e.g., several seconds, $$D_{agg} = \frac{1}{n}\left(\frac{D_1}{\langle D_1 \rangle} + \frac{D_2}{\langle D_2 \rangle} + \cdots\right),$$

where n is the number of differentials being aggregated. Aggregation over multiple pairs of reference points can facilitate reliable LoC detection in the instances where a view of the VRU changes with time, e.g., the pedestrian turns head and/or body, the pedestrian's nose being turned away from the sensing system but exposing ears for observation. Similarly, when an object on the ground obscures the pedestrian's ankles, the view of the knees can remain unobscured.

In some implementations LoC detection 138 monitors (and aggregates, if applicable, as described above) differentials $\{D_j(t_k)\}=D_1(t_k), D_2(t_k), \ldots D_N(t_k)$ for multiple frames of sensing data, e.g., $t_k=t_1, t_2, \ldots$. In some implementations, LoC detection 138 also averages time-dependent differentials over a certain (e.g., empirically selected) number of frames/times, e.g., over the last second, half-second, and/or any other time interval. In some implementations, LoC detection 138 can determine that an onset of an LoC is occurring based on a rate of temporal change (derivative, including a discrete derivative) $dD_j(t)/dt$ increasing above a normal range of variation represented by a threshold rate of change, $$\frac{dD_j(t)}{dt} \geq T_{rate}.$$

In some implementations, an actual change of the differentials $\Delta D_j$ over a certain predetermined (empirically) time/number of frames can be used in lieu of the rate of change, $$\Delta D_j \geq T_{change}.$$

In some implementations, in addition to satisfying the threshold rate or the threshold change condition, the VRU may have to be observed for at least a threshold time before an LoC determination can be made, to eliminate or reduce false positive LoC predictions. In some implementations, the choice of reference points used for LoC prediction and/or specific threshold conditions can depend on a particular VRU type 256, determined by object detection model 132 and/or computer vision backbone 250 (with reference to FIG. 2A). For example, as face or head features can be hidden under a motorcyclist's helmet, certain points associated with the helmet (e.g., geometric center, top, visor, and/or the like) itself can be used as the source for one or more upper-body reference points. Similarly, threshold conditions can be set differently for different types of VRUs or depending on a specific driving environment. For example, larger changes in a height differential for a motorcyclist going around bends can be more normal on a rural highway rather than on city streets. As a result, the motorcyclist's thresholds for such rural environments can be set higher than for urban environments.

In some implementations, LoC detection 138 can use tracks 254 of the VRUs as additional inputs. Tracks 254 can be provided by tracking and prediction component 134 that monitors motion of various VRUs once the VRUs enter the field of view of the sensing system and until they depart from the field of view. In one example implementation, tracks 234 can include coordinates $X(t_j)$ of the VRU (e.g., along multiple spatial dimensions), velocity $V(t_j)$ of the VRU, acceleration $a(t_j)$ of the VRU at various times $t_{j+1}$ (e.g., corresponding to different sensing frames) and/or the like. Tracking and prediction component 134 can predict future states of the VRU, e.g., as $X(t_{j+1})=X(t_j)+V(t_j)(t_{j+1}-t_j)+a(t_j)(t_{j+1}-t_j)^2/2$, $V(t_{j+1})=V(t_j)+a(t_j)(t_{j+1}-t_j)\}$, in one example non-limiting implementation. As new outputs of object detection model 132 become available for subsequent times $t_{j+1}$, $t_{j+2}$, . . . , the VRU tracks 254 can be updated using a Kalman filter that computes weighted combinations of a predicted state of the motion (based on a model of the VRU's motion, as in the above) and an observed state of the motion (generated by object detection model 132).

In some implementations, to reliably determine the onset of an LoC event and eliminate false positive detections, LoC detection 138 can use tracks 254 to exclude some benign activities, e.g., a pedestrian sitting down on a curb, bending to pick up a dropped item, loading/unloading a vehicle, and/or the like. For example, to rule out false positives, LoC detection 138 can use a combination of a change of the reference point differentials (e.g., as disclosed above) with acceleration of the VRU $a(t_j)$. An LoC event can be determined to occur provided that both a substantial change in the differential(s) $\Delta D$ has occurred (or is in the process of occurring) and the VRU is experiencing a (negative) threshold acceleration, which is likely associated with a disruption of normal VRU travel, e.g., as a result of falling, colliding with another object, hard braking, and/or the like. In one non-limiting example, a reference point metric $M_{RP}$ can be computed that is a weighted average of the differential(s) $\Delta D$ and the negative acceleration $-a$, e.g., $$M_{RP} = w_1 \cdot \Delta D + w_2 \cdot (-a).$$

with empirically selected weights $w_1$ and $w_2$, which can further depend on the type of VRU. For example, since motorcyclists are capable of braking faster than pedestrians, weight $w_2$ for motorcyclists can be lower than for pedestrians, to reduce the number of false positive LoC predictions for motorcyclists. Provided that metric $M_{RP}$ exceeds some threshold value $M_T$, LoC detection 138 can determine a likely LoC event.

In some implementations, LoC detection 138 can also use the prone state score S(t) and/or the rate of change dS(t)/dt of the prone state score. In some implementations, the determination of an LoC event can be made provided that the prone state score S(t) exceeds an empirical threshold $S_T$ or the rate of change of the LoC score dS(t)/dt exceeds another empirical threshold $S'_T$. The condition $dS(t)/dt \geq S'_T$ can indicate an onset of an LoC event, e.g., a VRU in the process of losing control and falling. The condition $S(t) \geq S_T$ can indicate an aftermath of an LoC event that has just occurred with a VRU lying (or sitting) on the ground. In other implementations, a determination of an onset of an LoC event can be made based on both the rate of change dS(t)/dt and a negative acceleration experienced by the VRU. In one non-limiting example, a prone score metric $M_{PS}$ can be computed that is a weighted average of the rate of change dS(t)/dt of the prone score and the negative acceleration $-a$, e.g., $$M_{PS} = u_1 \frac{dS(t)}{dt} + u_2(-a),$$

with empirically selected weights $u_1$ and $u_2$, which can further depend on the type of VRU. In some implementations, provided that at least one of the reference point metric $M_{KP}$ or the prone score metric $M_{PS}$ exceeds some threshold value $M_T$, LoC detection 138 can determine a likely LoC event. In other implementations, detection of an LoC event can be made provided that both the reference point metric $M_{KP}$ and the prone score metric $M_{PS}$ exceeds the threshold value $M_T$.

In some implementations, a determination of a LoC event can be subject to one or more filters of a filtering stage 260 to determine whether LoC detection processing is appropriate or is likely to lead to false positive detections. Although shown as being performed after LoC detection 138, in some implementations, filtering stage 260 can precede LoC detection 138. For example, filtering stage 260 can include a tracking history filter 261 that determines a duration T of tracking the VRU. If duration T is less than a set threshold time $T_0$ (e.g., one to several seconds, depending on a driving environment and type of VRU), the VRU can be an artifact rather than a real object, e.g., a reflection of another VRU by a mirror-like surface (such as a a window or side panel of another vehicle). Once the VRU has been observed for at least time $T_0$, the filtering stage 260 can accept the VRU as a real object.

Filtering stage 260 can further include a field-of-view filter 262 that determines whether the sensing system of the vehicle has a clear view of the VRU. For example, if the view of the VRU is acquired through a window of another object (car, bus, and/or the like), field-of-view filter 262 can determine that the various computed LoC metrics are not reliable enough to detect an occurrence (or a risk of occurrence) of an LoC event. Similarly, if a portion of the VRU (e.g., at least a certain threshold portion of the VRU's body, such as 30%, 40%, 50%, etc.) is obscured by other (more closely positioned) objects, field-of-view filter 262 can determine that the reliability of the sensing data is not sufficient and can postpone LoC determination until later, e.g., when a clearer view of the VRU becomes available.

Filtering stage 260 can further include a VRU type filter 263 that determines whether the object is of a type for which the LoC detection 138 is suitable. For example, LoC detection can be unreliable for children in strollers or for riders of recumbent bikes, for which reference points (and/or prone state score) can have a relatively low reliability resulting in a large probability of false positive determination.

Filtering stage 260 can further include a distance/speed filter 264 that determines whether the VRU is too far from the vehicle to be of concern. For example, if the object is at such distance d and the flow of traffic (including the vehicle) is moving with speed u relative to the vehicle, distance/speed filter 264 can determine that at least time d/u will pass before the vehicle reaches the VRU even if the VRU is to change its behavior dramatically, e.g., as a result of falling, slipping, colliding with another object, and/or the like. If time d/u is above the vehicle stoppage time (given the vehicle's current speed), distance/speed filter 264 can disable LoC detection 138 processing for the VRU at the present time, but can enable such processing at a later time, e.g., if distance d and/or the vehicle's speed changes.

Once LoC detection 138 determines the onset of an LoC event, the vehicle can implement an LoC response 270. For example, LoC detection 138 can presume that the VRU is to lose control immediately and output, to VCS 140, instructions to execute a driving maneuver that maximizes the separation between the vehicle and the VRU, e.g., by braking, reducing the amount of throttle, nudging, moving to a different available lane, and/or the like.

In some implementations, LoC response 270 can depend on a confidence of LoC detection. The confidence can refer to the value of the reference point metric $M_{KP}$ and/or prone state metric $M_{PS}$, e.g., how much one or both metrics exceed the threshold metric(s). In those instances where confidence is high, LoC response 270 can include further observation and tracking of the VRU until the confidence improves. LoC response 270 can be implemented by VCS 140, including but not limited to performing immediate braking, delayed braking, nudging within the same lane of travel, moving to a different lane, and/or otherwise increasing a separation between the vehicle and the object.

In some implementations, where the distance from an autonomous vehicle to the VRU at the time of LoC detection is less than a certain empirically set distance, e.g., 6-10 meters, LoC response 270 can presume as a default that it is likely that the vehicle's driving path has caused or affected the loss of control by the VRU (even when no direct contact with the VRU has been detected). LoC response 270 can then stop the vehicle at a side of the road until the situation resolves, e.g., the VRU gets up and resumes its motion, or further develops, e.g., police arrive to handle the situation. In some implementations, the vehicle can stop and request instructions from a remote assistant 282, which can be deployed by a dispatch server 280 of a fleet of the autonomous vehicles. For example, remote assistant 282 (which can be a human person, computing software, or both) can review the sensing data (including camera feed and/or lidar/radar data logs) and decide whether the autonomous vehicle is responsible for the occurred situation and whether the vehicle should resume the motion or reman at the scene. Remote assistant 282 can then communicate this decision to the autonomous vehicle.

Figure 6:
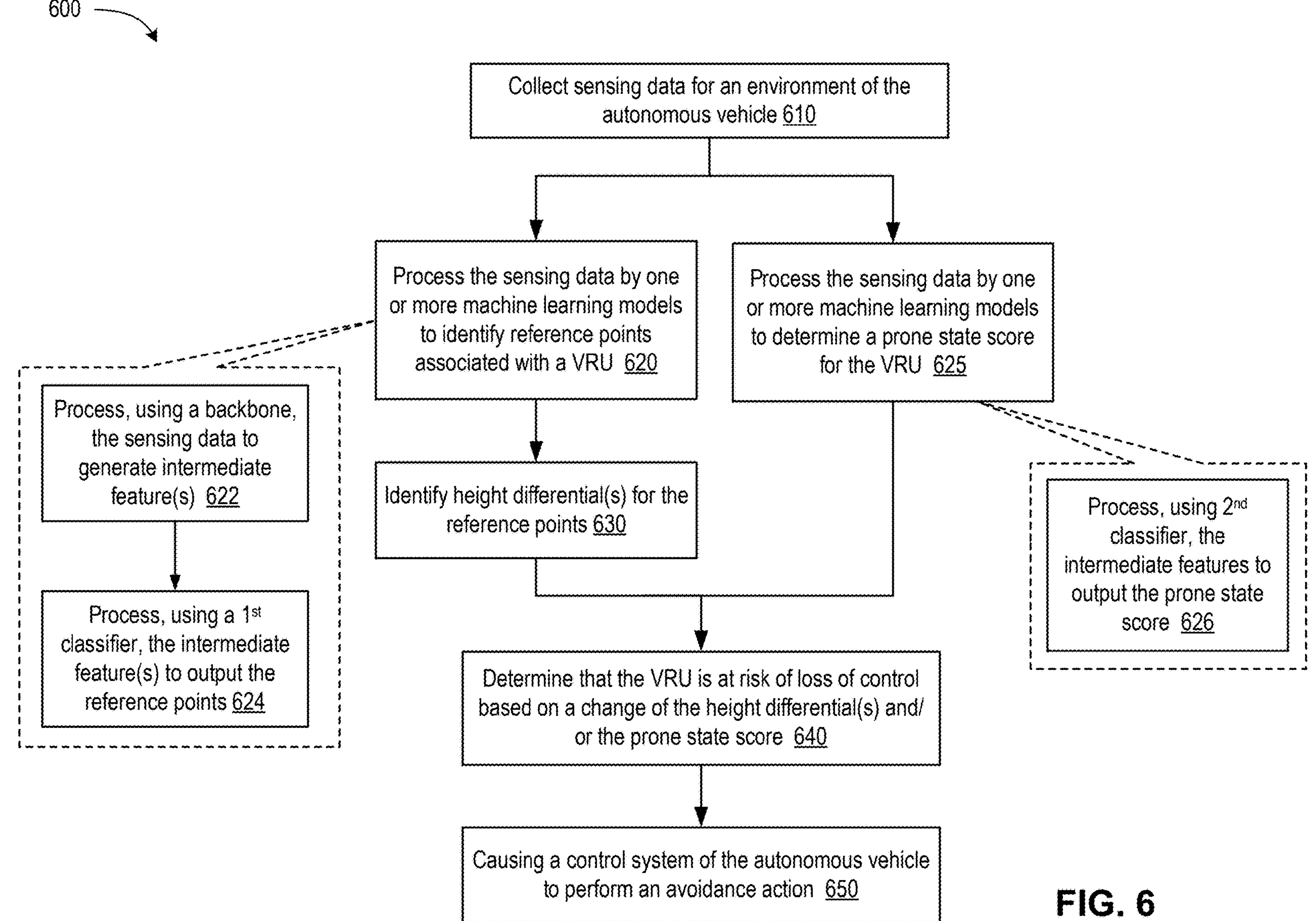
FIG. 6 illustrates an example method of identifying vulnerable road users that are at risk of loss of control in driving environments, in accordance with some implementations of the present disclosure.

FIG. 6 illustrates an example method 600 of identifying vulnerable road users that are at risk of loss of control in driving environments, in accordance with some implementations of the present disclosure. A processing device, having one or more processing units (CPUs), one or more graphics processing units (GPUs), one or more parallel processing units (PPUs) and memory devices communicatively coupled to the CPU(s), GPU(s), and/or PPU(s) can perform method 600 and/or each of its individual functions, routines, subroutines, or operations. Method 600 can be directed to systems and components of a vehicle. In some implementations, the vehicle can be an autonomous vehicle. In some implementations, the vehicle can be a driver-operated vehicle equipped with driver-assistance systems, e.g., Level 2 or Level 3 driver assistance systems, that provide limited assistance with specific vehicle functions (e.g., steering, braking, acceleration, etc. systems) or under limited driving conditions (e.g., highway driving). The processing device (e.g., processor 128 in FIG. 1) executing method 600 can perform instructions issued by the perception and planning system 130 of FIG. 1 and, more specifically, of object detection model 132, tracking and prediction component 134, reference point detection 135, prone state detection 136, LoC detection 138, and/or the like, during driving operations of the vehicle. Operations of method 600 may be performed responsive to instructions stored in non-transient computer-readable memory (e.g., system memory 126 in FIG. 1). In certain implementations, a single processing thread can perform method 600. Alternatively, two or more processing threads can perform method 600, each thread executing one or more individual functions, routines, subroutines, or operations of the method. In an illustrative example, the processing threads implementing method 600 can be synchronized (e.g., using semaphores, critical sections, and/or other thread synchronization mechanisms). Alternatively, the processing threads implementing method 600 can be executed asynchronously with respect to each other. Some operations of method 600 can be performed in a different order compared with the order shown in FIG. 5. Some operations of method 600 can be performed concurrently with other operations. Some operations can be optional.

At block 610, method 600 can include collecting, using a sensing system of an autonomous vehicle (e.g., sensing system 110, with reference to FIG. 1), sensing data for an environment of the autonomous vehicle. The sensing data can include camera data (e.g., one or more camera images), lidar data (e.g., lidar point cloud), radar data (e.g., radar returns), or any combination thereof. In some implementations, any of the data/images can be cropped patches/portions of sensing data associated with a specific VRU in the environment (e.g., as can be detected and cropped by the object detection model 132). In some implementations, the sensing system includes a camera that collects the camera data. In some implementations, the sensing system includes a lidar sensor that collects the lidar data and/or a radar sensor that collects the radar data. In some implementations, the VRU can include a pedestrian, a bicyclist, a motorcyclist, a scooter rider, a skateboard rider, wheelchair rider, and/or the like.

At block 620, method 600 can continue with processing the sensing data by one or more machine learning models (e.g., VRU perception model 235, with reference to FIG. 2A) to identify a plurality of reference points associated with a VRU. In some implementations, the plurality of reference points can include at least one reference point associated with an upper body of the VRU and at least one reference point associated with a lower body of the VRU (e.g., as illustrated in FIGS. 4A-4C). In some implementations, to identify the plurality of reference points, the one or more machine learning models can be trained to process a portion of the camera data associated with the VRU and at least a portion of the lidar data associated with the VRU or a portion of the radar data associated with the VRU.

In some implementations, identifying the reference points can include operations illustrated with the left callout portion of FIG. 6. More specifically, at block 622, method 600 can include processing, using a backbone (e.g., computer vision backbone 250 in FIG. 2A), the sensing data to generate one or more intermediate features (e.g., intermediate features 252). At block 624, method 600 can continue with processing, using a first classifier (e.g., reference point detection 135 in FIG. 2A), the one or more intermediate features to output the plurality of reference points.

In some implementations, at block 625, method 600 can further include processing the sensing data by the one or more machine learning models to determine a prone state score for the VRU. The prone state score can characterize a likelihood that the VRU is in a prone position or transitioning to the prone position (e.g., as illustrated in FIGS. 5A-5C). In some implementations, determining the prone state score can include operations illustrated with the right callout portion of FIG. 6. More specifically, at block 626, method 600 can include processing, using a second classifier (e.g., prone state detection 136 in FIG. 2A), the one or more intermediate features to output the prone state score.

At block 630, method 600 can continue with identifying one or more height differentials for the plurality of reference points (e.g., as illustrated in FIGS. 4A-4C). In some implementations, the one or more height differential can be identified for multiple times (or frames) during which the VRU is being observed (tracked).

At block 640, method 600 can include determining that the VRU is at risk of loss of control, based on a change of the one or more height differentials and/or the prone state score. For example, determining that the VRU is at risk of loss of control can include detecting that the change of the one or more height differentials satisfies a threshold condition. In some implementations, the threshold condition can include the one or more height differentials experiencing at least a threshold change and/or experiencing at least a threshold rate of change (e.g., with time or across frames).

In some implementations, determining that the VRU is at risk of loss of control can be further based on an acceleration of the VRU (e.g., determined by tracking and prediction component 134). In some implementations, determining that the VRU is at risk of loss of control can be further based on the prone state score.

In some implementations, determining that the VRU is at risk of loss of control can be based on the change (or rate of change) of the one or more height differentials satisfying a first threshold condition and the prone state score satisfying a second threshold condition. For example, for LoC determination, the height differentials (or aggregated height differentials) or the rate of change of the height differentials have to be at or above certain empirical values (e.g., $\Delta D>D_T$ or $dD(t)/dt>V_T$, with empirical values $D_T$ and $V_T$) and the prone state score or the rate of change of the prone state score has to be at or above another empirical value ($S(t)>S_T$ or $dS(t)/dt>U_T$, with empirical values $S_T$ and $U_T$).

In some implementations, determining that the VRU is at risk of loss of control can be based on a combination of the one or more height differentials and the prone state score satisfying a third threshold condition (e.g., a weighted sum $W_1\cdot\Delta D+W_2\cdot S(t)>X_T$, with empirical weights $W_1$ and $W_2$ and value $X_T$).

In some implementations, determining that the VRU is at risk of loss of control can be based on an acceleration of the VRU satisfying a fourth threshold condition (e.g., $a>a_T$, with empirical value $a_T$) and the one or more height differentials satisfying a fifth threshold condition (e.g., $\Delta D>DD_T$, with empirical value $DD_T$) or based on the acceleration of the VRU satisfying the fourth threshold condition and the prone state score satisfying a sixth threshold condition ($S(t)>SS_T$ or $dS(t)/dt>UU_T$, with empirical values $SS_T$ and $UU_T$). In some implementations, any of the threshold conditions (and values) can be different for different types of VRUs (e.g., as detected by object detection model 132 with reference to FIG. 2A).

At block 650, method 600 can continue with causing a control system of the autonomous vehicle (e.g., VCS 140 in FIG. 2B) to perform an avoidance action. The avoidance action can include a change of a speed of the autonomous vehicle, e.g., braking or acceleration. The avoidance action can also include a lateral shift of the autonomous vehicle, e.g., a nudge within the same traffic lane, a change of the traffic lane, and/or the like, away from the VRU. In some implementations, causing the control system of the autonomous vehicle to perform the avoidance action is responsive to a confidence level of LoC determination being above a threshold confidence.

Figure 7:
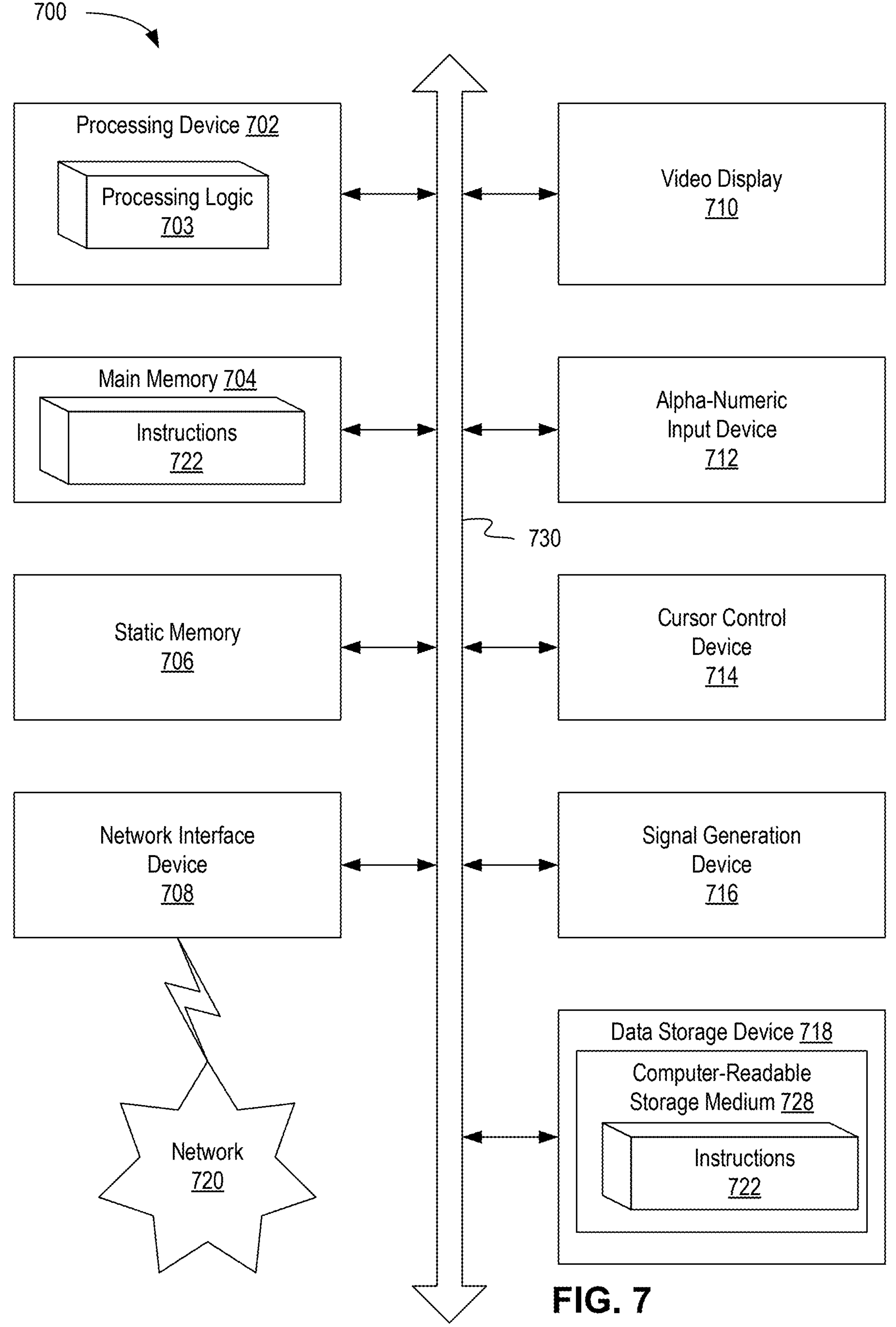
FIG. 7 depicts a block diagram of an example computer device capable of identifying and responding to presence of VRMs in driving environments that are at risk of loss of control of their motion, in accordance with some implementations of the present disclosure.

FIG. 7 depicts a block diagram of an example computer device 700 capable of identifying and responding to presence of VRMs in driving environments that are at risk of loss of control of their motion, in accordance with some implementations of the present disclosure. Example computer device 700 can be connected to other computer devices in a LAN, an intranet, an extranet, and/or the Internet. Computer device 700 can operate in the capacity of a server in a client-server network environment. Computer device 700 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 700 can include a processing device 702 (also referred to as a processor or CPU), a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 718), which can communicate with each other via a bus 730.

In some implementations, processing device 702 may be or include processor 128 of FIG. 1 and main memory 704 can be or include system memory 126 in FIG. 1.

Processing device 702 (which can include processing logic 703) represents one or more general-purpose processing devices such as a microprocessor, central processing unit, or the like. More particularly, processing device 702 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 702 can be configured to execute instructions performing method 600 of identifying vulnerable road users that are at risk of loss of control in driving environments.

Example computer device 700 can further include a network interface device 708, which can be communicatively coupled to a network 720. Example computer device 700 can further comprise a video display 710 (e.g., a liquid crystal display (LCD), a touch screen, or a cathode ray tube (CRT)), an alphanumeric input device 712 (e.g., a keyboard), a cursor control device 714 (e.g., a mouse), and an acoustic signal generation device 716 (e.g., a speaker).

Data storage device 718 can include a computer-readable storage medium (or, more specifically, a non-transitory computer-readable storage medium) 728 on which is stored one or more sets of executable instructions 722. In accordance with one or more aspects of the present disclosure, executable instructions 722 can comprise executable instructions performing method 600 of identifying vulnerable road users that are at risk of loss of control in driving environments.

Executable instructions 722 can also reside, completely or at least partially, within main memory 704 and/or within processing device 702 during execution thereof by example computer device 700, main memory 704 and processing device 702 also constituting computer-readable storage media. Executable instructions 722 can further be transmitted or received over a network via network interface device 708.

While the computer-readable storage medium 728 is shown in FIG. 7 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A system comprising:

a sensing system of an autonomous vehicle, the sensing system to collect sensing data for an environment of the autonomous vehicle; and a perception system of the autonomous vehicle, the perception system to:

process the sensing data by one or more machine learning models to identify a plurality of reference points associated with a vulnerable road user (VRU) in the environment;

identify one or more height differentials for the plurality of reference points;

determine that the VRU is at risk of loss of control, based at least on a change of the one or more height differentials; and cause a control system of the autonomous vehicle to perform an avoidance action.

2. The system of claim 1, wherein the plurality of reference points comprise at least one reference point associated with an upper body of the VRU and at least one reference point associated with a lower body of the VRU.

3. The system of claim 2, wherein to determine that the VRU is at risk of loss of control, the perception system is to detect that the change of the one or more height differentials satisfies a threshold condition.

4. The system of claim 3, wherein the threshold condition comprises at least one of:

the one or more height differentials experiencing at least a threshold change, or the one or more height differentials experiencing at least a threshold rate of change.

5. The system of claim 1, wherein the VRU is determined to be at risk of loss of control in further view of an acceleration of the VRU.

6. The system of claim 1, wherein the one or more machine learning models are further to determine a prone state score for the VRU, wherein the prone state score characterizes a likelihood that the VRU is in a prone position or transitioning to the prone position, and wherein the VRU is determined to be at risk of loss of control in further view of the prone state score.

7. The system of claim 6, wherein the VRU is determined to be at risk of loss of control based at least on one of:

the change of the one or more height differentials satisfying a first threshold condition and the prone state score satisfying a second threshold condition;

a combination of the one or more height differentials and the prone state score satisfying a third threshold condition; or an acceleration of the VRU satisfying a fourth threshold condition and at least one of:

the one or more height differentials satisfying a fifth threshold condition, or the prone state score satisfying a sixth threshold condition.

8. The system of claim 6, wherein the one or more machine learning models comprise:

a backbone trained to process the sensing data and generate one or more intermediate features;

a first classifier trained to process the one or more intermediate features and output the plurality of reference points; and a second classifier trained to process the one or more intermediate features and output the prone state score.

9. The system of claim 1, wherein the sensing data comprises camera data and at least one of lidar data or radar data, and wherein the sensing system comprises:

a camera to collect the camera data; and at least one of a lidar sensor to collect the lidar data, or a radar sensor to collect the radar data; and wherein to identify the plurality of reference points, the one or more machine learning models are trained to process:

a portion of the camera data associated with the VRU, and at least a portion of the lidar data associated with the VRU or a portion of the radar data associated with the VRU.

10. The system of claim 1, wherein the VRU comprises at least one of:

a pedestrian, a bicyclist, a motorcyclist, a scooter rider, a skateboard rider, or a wheelchair rider.

11. A system comprising:

a sensing system of an autonomous vehicle, the sensing system to collect sensing data for an environment of the autonomous vehicle; and a perception system of the autonomous vehicle, the perception system to:

process the sensing data by one or more machine learning models to:

identify a plurality of reference points associated with a vulnerable road user (VRU) in the environment;

determine a prone state score for the VRU, wherein the prone state score characterizes a likelihood that the VRU is in a prone position or transitioning to the prone position; and identify one or more height differentials for the plurality of reference points;

determine that the VRU is at risk of loss of control, based on an acceleration of the VRU and at least one of:

a change of the one or more height differentials; or the prone state score; and cause a control system of the autonomous vehicle to perform an avoidance action.

12. The system of claim 11, wherein the VRU is determined to be at risk of loss of control based at least on one of:

the acceleration of the VRU satisfying a first threshold condition and the one or more height differentials satisfying a second threshold condition, or a combination of the acceleration of the VRU and the one or more height differentials satisfying a third threshold condition.

13. The system of claim 11, wherein the VRU is determined to be at risk of loss of control based at least on one of:

the acceleration of the VRU satisfying a first threshold condition and the prone state score satisfying a second threshold condition, or a combination of the acceleration of the VRU and the prone state score satisfying a third threshold condition.

14. A method comprising:

collecting, using a sensing system of an autonomous vehicle, sensing data for an environment of the autonomous vehicle;

processing the sensing data by one or more machine learning models to identify a plurality of reference points associated with a vulnerable road user (VRU) in the environment;

identifying one or more height differentials for the plurality of reference points;

determining that the VRU is at risk of loss of control, based at least on a change of the one or more height differentials; and causing a control system of the autonomous vehicle to perform an avoidance action.

15. The method of claim 14, wherein determining that the VRU is at risk of loss of control comprises:

detecting that the change of the one or more height differentials satisfies a threshold condition, wherein the threshold condition comprises at least one of:

the one or more height differentials experiencing at least a threshold change, or the one or more height differentials experiencing at least a threshold rate of change.

16. The method of claim 14, wherein determining that the VRU is at risk of loss of control is further based on an acceleration of the VRU.

17. The method of claim 14, wherein the one or more machine learning models are further to determine a prone state score for the VRU, wherein the prone state score characterizes a likelihood that the VRU is in a prone position or transitioning to the prone position, and wherein determining that the VRU is at risk of loss of control is further based on the prone state score.

18. The method of claim 17, wherein the determining that the VRU is at risk of loss of control is based at least on one of:

the change of the one or more height differentials satisfying a first threshold condition and the prone state score satisfying a second threshold condition;

a combination of the one or more height differentials and the prone state score satisfying a third threshold condition; or an acceleration of the VRU satisfying a fourth threshold condition and at least one of:

the one or more height differentials satisfying a fifth threshold condition, or the prone state score satisfying a sixth threshold condition.

19. The method of claim 17, wherein processing the sensing data by one or more machine learning models comprises:

processing, using a backbone, the sensing data to generate one or more intermediate features;

processing, using a first classifier, the one or more intermediate features to output the plurality of reference points; and processing, using a second classifier, the one or more intermediate features to output the prone state score.

20. The method of claim 14, wherein the sensing data comprises camera data and at least one of lidar data or radar data, and wherein the sensing system comprises:

a camera to collect the camera data; and at least one of a lidar sensor to collect the lidar data, or a radar sensor to collect the radar data; and wherein to identify the plurality of reference points, the one or more machine learning models are trained to process:

a portion of the camera data associated with the VRU, and at least a portion of the lidar data associated with the VRU or a portion of the radar data associated with the VRU.

* * * * *